United States Patent
Uchiyama et al.

(10) Patent No.: US 10,834,646 B2
(45) Date of Patent: Nov. 10, 2020

(54) COMMUNICATION DEVICE AND COMMUNICATION METHOD

(71) Applicant: Sony Corporation, Tokyo (JP)

(72) Inventors: Hiromasa Uchiyama, Tokyo (JP); Kazuyuki Shimezawa, Kanagawa (JP); Naoki Kusashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/314,669

(22) PCT Filed: Jun. 26, 2017

(86) PCT No.: PCT/JP2017/023432
§ 371 (c)(1),
(2) Date: Jan. 1, 2019

(87) PCT Pub. No.: WO2018/030007
PCT Pub. Date: Feb. 15, 2018

(65) Prior Publication Data
US 2019/0320361 A1      Oct. 17, 2019

(30) Foreign Application Priority Data

Aug. 8, 2016   (JP) ................................. 2016-155673

(51) Int. Cl.
*H04W 36/00* (2009.01)
*H04W 36/30* (2009.01)
(Continued)

(52) U.S. Cl.
CPC ......... *H04W 36/03* (2018.08); *H04W 36/305* (2018.08); *H04M 1/72519* (2013.01); *H04M 1/72522* (2013.01); *H04W 48/16* (2013.01)

(58) Field of Classification Search
CPC ... H04W 36/03; H04W 36/305; H04W 8/245; H04W 88/02; H04W 48/16; H04M 1/72519; H04M 1/72522; H04J 11/0069
(Continued)

(56) References Cited

U.S. PATENT DOCUMENTS 7,907,540 B2    3/2011   Li et al.
10,390,244 B2 *  8/2019   Cheng ................... H04W 24/08
(Continued)

FOREIGN PATENT DOCUMENTS

JP    2007-165980 A    6/2007
JP    2011-109474 A    6/2011
(Continued)

OTHER PUBLICATIONS

Extended European Search Report dated Apr. 26, 2019, issued in corresponding European Patent Application No. 17839081.1.
(Continued)

*Primary Examiner* — Danh C Le
(74) *Attorney, Agent, or Firm* — Xsensus LLP

(57) ABSTRACT

[Object] To realize handover in relay communication using a relay terminal in a more satisfactory manner.
[Solution] A communication device including: a communication unit configured to perform wireless communication; and a control unit configured to acquire information regarding a communication quality of one or more radio links including at least one of a direct first radio link or a second radio link via a relay terminal, which is configured to be movable, between a remote terminal and a base station, and to switch the radio link to be used in communication between the remote terminal and the base station on the basis of the acquired information regarding the communication quality.

24 Claims, 24 Drawing Sheets

(51) Int. Cl.
*H04M 1/725* (2006.01)
*H04W 48/16* (2009.01)

(58) Field of Classification Search
USPC .................. 455/436, 550.1, 11.1; 370/328
See application file for complete search history.

(56) References Cited

U.S. PATENT DOCUMENTS

| | | | |
|---|---|---|---|
| 2012/0212682 A1 | 8/2012 | Kuromizu | |
| 2015/0055472 A1* | 2/2015 | Skarby | H04W 28/10 370/235 |
| 2015/0111590 A1* | 4/2015 | Gruet | H04W 24/02 455/452.1 |
| 2016/0029234 A1* | 1/2016 | Zhang | H04W 72/1215 370/252 |
| 2016/0262143 A1* | 9/2016 | Breuer | H04W 76/20 |
| 2016/0286374 A1* | 9/2016 | Baghel | H04W 76/14 |
| 2016/0330784 A1* | 11/2016 | Liu | H04W 12/06 |
| 2016/0337954 A1* | 11/2016 | Gulati | H04W 76/14 |
| 2017/0359766 A1* | 12/2017 | Agiwal | H04W 76/14 |
| 2017/0366958 A1* | 12/2017 | Ryu | H04W 8/005 |
| 2018/0001018 A1* | 1/2018 | Burke | A61B 5/0026 |
| 2018/0035354 A1* | 2/2018 | Martin | H04W 40/12 |
| 2018/0138965 A1* | 5/2018 | Martin | H04B 7/15507 |
| 2018/0139682 A1* | 5/2018 | Xu | H04W 88/04 |
| 2018/0255505 A1* | 9/2018 | Thyagarajan | H04J 11/0069 |
| 2019/0036595 A1* | 1/2019 | Ohtsuji | H04W 40/12 |
| 2019/0069047 A1* | 2/2019 | Wood | H04N 21/2668 |
| 2019/0098093 A1* | 3/2019 | Funahara | H04L 67/125 |

FOREIGN PATENT DOCUMENTS

| | | |
|---|---|---|
| JP | 2015-216663 A | 12/2015 |
| JP | 2016-506089 A | 2/2016 |
| WO | 2006/104105 A1 | 10/2006 |

OTHER PUBLICATIONS

International Search Report dated Sep. 12, 2017 for PCT/JP2017/023432 filed on Jun. 26, 2017, 9 pages with English translation.

* cited by examiner

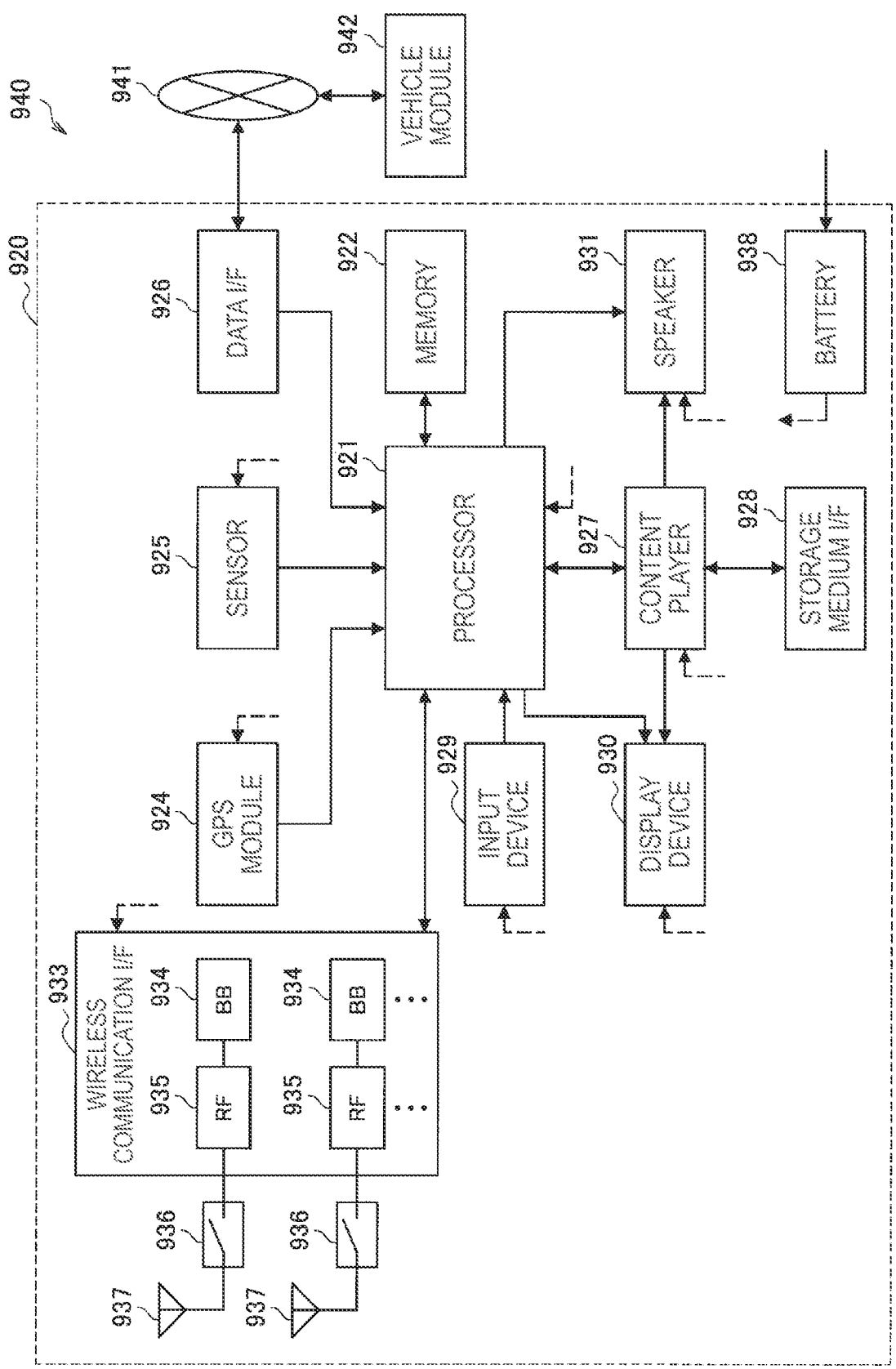

COMMUNICATION DEVICE AND COMMUNICATION METHOD

CROSS-REFERENCE TO RELATED APPLICATIONS

This application is a National Stage Application based on PCT/JP2017/023432, filed on 26 Jun. 2017, and claims priority to Japanese Patent Application No. 2016-155673, filed on 8 Aug. 2016, the entire contents of which being incorporated herein by reference.

TECHNICAL FIELD

The present disclosure relates to a communication device and a communication method.

BACKGROUND ART

Technologies relating to the Internet-of-things (IoT) have gained attention in recent years, and research and development thereon has been actively conducted. Things need to be connected to networks in the IoT, and thus wireless communication has become an ever more important theme of technology. The current 3GPP has standardized communication methods specialized for IoT terminals, such as Machine Type Communication (MTC) and Narrowband IoT (NB-IoT). As characteristics of such communication methods for IoT terminals, realization of lower power consumption, low costs, and large coverage may be exemplified. In particular, communication with lower power consumption is very important for low-cost terminals such as IoT terminals, and further enhancement thereof is expected in the future.

As an example of representative low-cost terminals, so-called wearable terminals may be exemplified. Wearable terminals are required to have low power consumption and highly reliable communication, and also large capacity communication in accordance with situations. In order to cover such application cases, the 3GPP started the standardization of Further Enhancement D2D (FeD2D) in 2016. Since wearable terminals are present close to users, a communication distance can be shortened and communication with low power consumption and highly reliable communication can be realized by using relay communication using terminals such as smartphones.

CITATION LIST

Patent Literature

Patent Literature 1: JP 2015-216663A

DISCLOSURE OF INVENTION

Technical Problem

Meanwhile, terminal devices that can operate as relay terminals are not present in a fixed state at all times in most cases, like a base station, and thus a case of a situation in which it is difficult for a terminal device to function as a relay terminal due to various reasons can be assumed. Thus, communication in which service continuity (Service continuity) is secured and Quality of Service (QoS) is guaranteed is required to be realized even in an unstable situation by, for example, performing handover from a relay terminal in communication with another relay terminal or stopping relay communication and switching to direct communication with a base station. As a reference, Patent Literature 1 discloses an example of a mechanism for realizing handover between base stations.

Therefore, the present disclosure proposes a communication device and a communication method that enable handover in relay communication using a relay terminal to be realized in a more satisfactory manner.

Solution to Problem

According to the present disclosure, there is provided a communication device including: a communication unit configured to perform wireless communication; and a control unit configured to acquire information regarding a communication quality of one or more radio links including at least one of a direct first radio link or a second radio link via a relay terminal, which is configured to be movable, between a remote terminal and a base station, and to switch the radio link to be used in communication between the remote terminal and the base station on the basis of the acquired information regarding the communication quality.

In addition, according to the present disclosure, there is provided a communication device including: a communication unit configured to perform wireless communication; and a notification unit configured to acquire information regarding a communication quality of at least one of a direct first radio link or a second radio link via a relay terminal, which is configured to be movable, between a remote terminal and a base station, and to directly or indirectly notify an external device that switches the radio link to be used in communication between the remote terminal and the base station of the acquired information regarding the communication quality.

In addition, according to the present disclosure, there is provided a communication device including: a communication unit configured to perform wireless communication, and a control unit configured to allocate a resource for communication between a first relay terminal and a second relay terminal in a case in which, on the basis of information regarding a communication quality of one or more radio links including at least one of a direct first radio link or a second radio link via a relay terminal, which is configured to be movable, between a remote terminal and a base station, it is decided that the radio link to be used in communication between the remote terminal and the base station is to be switched from the second radio link via the first relay terminal to the second radio link via the second relay terminal.

In addition, according to the present disclosure, there is provided a communication method including: performing wireless communication; and acquiring, by a computer information regarding a communication quality of one or more radio links including at least one of a direct first radio link or a second radio link via a relay terminal, which is configured to be movable, between a remote terminal and a base station via wireless communication, and switching the radio link to be used in communication between the remote terminal and the base station on the basis of the acquired information regarding the communication quality.

In addition, according to the present disclosure, there is provided a communication method including: performing wireless communication; and acquiring, by a computer, information regarding a communication quality of at least one of a direct first radio link or a second radio link via a relay terminal, which is configured to be movable, between a remote terminal and a base station via wireless communication, and directly or indirectly notifying an external device that switches the radio link to be used in communication between the remote terminal and the base station of the acquired information regarding the communication quality.

In addition, according to the present disclosure, there is provided a communication method including: performing wireless communication; and allocating, by a computer, a resource for communication between a first relay terminal and a second relay terminal in a case in which, on the basis of information regarding a communication quality of one or more radio links including at least one of a direct first radio link or a second radio link via a relay terminal, which is configured to be movable, between a remote terminal and a base station, it is decided that the radio link to be used in communication between the remote terminal and the base station is to be switched from the second radio link via the first relay terminal to the second radio link via the second relay terminal.

Advantageous Effects of Invention

According to the present disclosure described above, a communication device and a communication method that enable handover in relay communication using a relay terminal to be realized in a more satisfactory manner are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 26 is a block diagram illustrating an example of a schematic configuration of a car navigation apparatus.

MODE(S) FOR CARRYING OUT THE INVENTION

Figure 1:
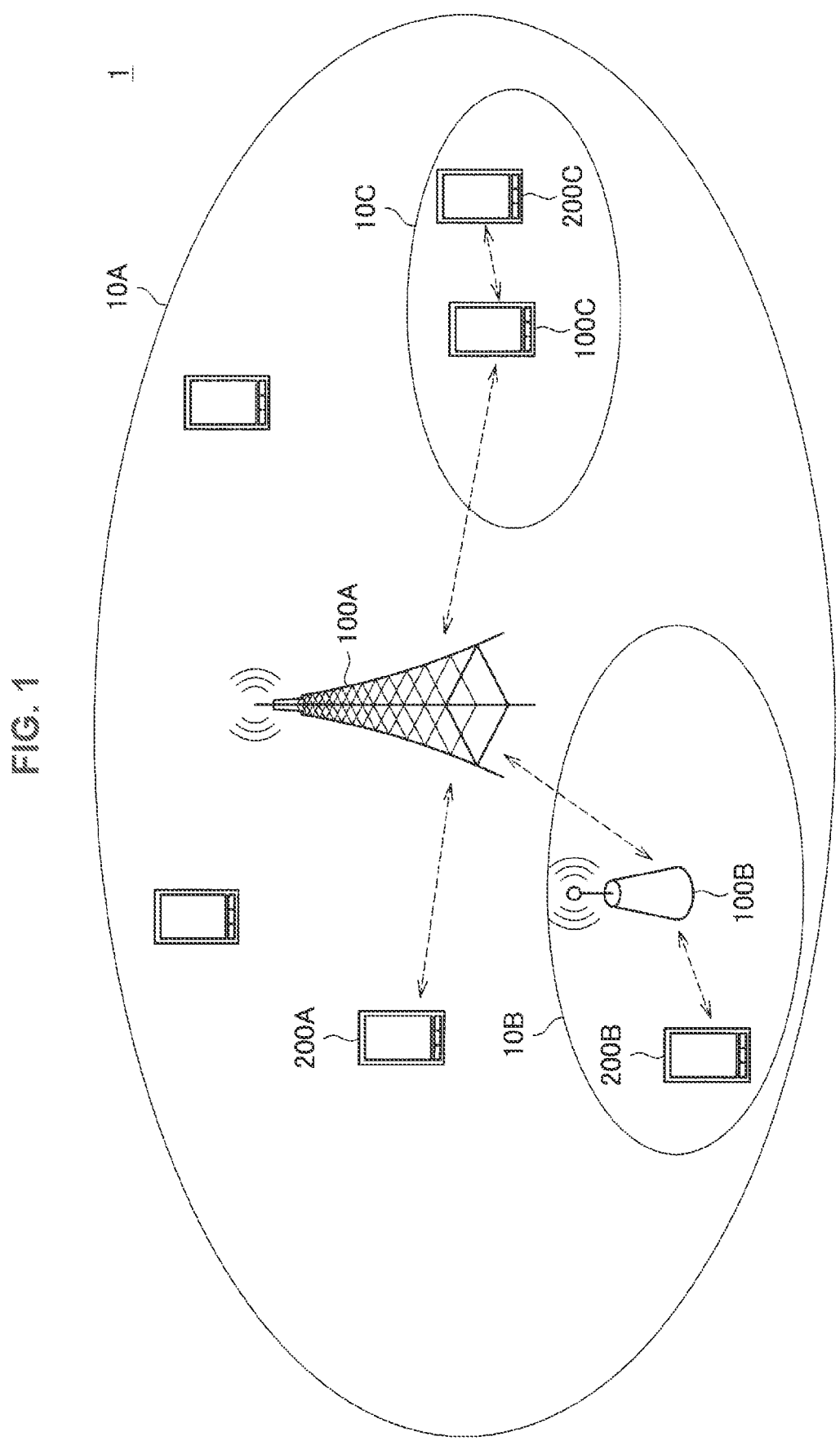
FIG. 1 is an explanatory diagram for describing an example of a schematic configuration of a system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Introduction
1.1. Example of system configuration
1.2. Review of communication via relay terminal
2. Configuration example
2.1. Configuration example of base station
2.2. Configuration example of terminal device
3. Technical features
3.1. RLM procedure
3.2. RLM of mobile relay communication
3.3. Handover and reselection in mobile relay communication
4. Application examples
4.1. Application examples for base station
4.2. Application examples for terminal device
5. Conclusion

1. INTRODUCTION

<1.1. Example of System Configuration>

First, an example of a schematic configuration of a system 1 according to an embodiment of the present disclosure will be described with reference to FIG. 1. FIG. 1 is an explanatory diagram for describing an example of a schematic configuration of the system 1 according to an embodiment of the present disclosure. The system 1 includes wireless communication devices 100 and terminal devices 200 as illustrated in FIG. 1. The terminal devices 200 can also be called users here. The users can also be called UE. A wireless communication device 100 can also be called UE-Relays. The UE here may be UE defined in LTE or LTE-A, and the UE-Relays may be Prose UE to Network Relay discussed in the 3GPP or may mean communication apparatuses more generally.

(1) Wireless Communication Device 100

The wireless communication devices 100 are devices that provide wireless communication services to devices under their control. For example, a wireless communication device 100A may be a base station of a cellular system (or a mobile communication system). The base station 100A performs wireless communication with a device (e.g., a terminal device 200A) positioned in a cell 10A of the base station 100A. The base station 100A, for example, transmits a downlink signal to the terminal device 200A and receives an uplink signal from the terminal device 200A.

The base station 100A is logically connected to another base station on, for example, an X2 interface and can transmit and receive control information and the like. In addition, the base station 100A is logically connected to a so-called core network (not illustrated) on, for example, an S1 interface, and can transmit and receive control information and the like. Note that the communication between the devices can be physically relayed by various devices.

Here, the wireless communication device 100A illustrated in FIG. 1 is a macro cell base station and the cell 10A is a macro cell. Meanwhile, wireless communication devices 100B and 100C, are master devices operating small cells 10B and 10C respectively. As an example, the master device 100B may be a small cell base station that is fixedly installed. The small cell base station 100B establishes each of a wireless backhaul link with the macro cell base station 100A and an access link with one or more terminal devices (e.g., a terminal device 200B) within the small cell 10B. Note that the wireless communication device 100B may be a relay node defined by the 3GPP. The master device 100C is a dynamic access point (AP). The dynamic AP 100C is a moving device dynamically operating the small cell 10C The dynamic AP 100C establishes each of a wireless backhaul link with the macro cell base station 100A and an access link with one or more terminal devices (e.g., a terminal device 200C) within the small cell 10C. The dynamic AP 100C may be, for example, a terminal device in which hardware or software that can operate as a base station or a wireless access point is mounted. In this case, the small cell 10C is a dynamically formed localized network (Localized Network/Virtual Cell).

The cell 10A may be operated in an arbitrary wireless communication method, for example, LTE, LTE-A (LTE-Advanced), LTE-ADVANCED PRO, GSM (registered trademark), UMTS, W-CDMA, CDMA 200, WiMAX, WiMAX 2, IEEE 802.16, or the like.

Note that a small cell is a concept that can include various types of cell smaller than a macro cell (e.g., a femto cell, a nano cell, a pico cell, a micro cell, and the like) disposed to overlap or not to overlap a macro cell. In a certain example, a small cell is operated by a dedicated base station. In another example, a small cell is operated when a terminal serving as a master device temporarily operates as a small cell base station A so-called relay node can also be regarded as a form of a small cell base station. A wireless communication device functioning as a parent station of a relay node is also called a donor base station. A donor base station may mean a DeNB in LTE or a parent station of a relay node more generally.

(2) Terminal Device 200

The terminal devices 200 can communicate in a cellular system (or a mobile communication system). The terminal devices 200 perform wireless communication with a wireless communication device (e.g., the base station 100A, the master device 100B or 100C) of the cellular system. For example, the terminal device 200A receives a downlink signal from the base station 100A and transmits an uplink signal to the base station 100A.

In addition, the terminal devices 200 are not limited only to so-called UE, and a so-called low cost terminal (low cost UE), for example, an MTC terminal, an eMTC (Enhanced MTC) terminal, or an NB-IoT terminal may be applied.

(3) Supplement

Although the schematic configuration of the system 1 has been introduced above, the present technology is not limited to the example illustrated in FIG. 1. For example, a configuration including no master device, a Small Cell Enhancement (SCE), a heterogeneous network (HetNet), an MTC network, or the like can be employed as a configuration of the system 1. In addition, as another example of the configuration of the system 1, a master device may be connected to a small cell and constitute a cell under the small cell.

<1.2. Review of Communication Via Relay Terminal>

Next, an example of a case in which communication between a so-called remote terminal such as a wearable terminal and a base station is realized by a terminal device such as a smartphone behaving as a relay terminal will be described and a technical task of the system according to the present embodiment will be summarized. Note that a terminal device that operates as a relay terminal will also be referred to as a "relay terminal 100C" below. In addition, a terminal device that operates as a remote terminal will also be referred to as a "remote terminal 200C."

Technologies relating to the Internet-of-things (IoT) have gained attention in recent years, and research and development thereon has been actively conducted. Things need to be connected to networks in the IoT, and thus wireless communication has become an ever more important theme of technology. The current 3GPP has standardized communication methods specialized for IoT terminals, such as Machine Type Communication (MTC) and Narrowband IoT (NB-IoT) As characteristics of such communication methods for IoT terminals, realization of lower power consumption, low costs, and large coverage may be exemplified. In particular, communication with lower power consumption is very important for low-cost terminals such as IoT terminals, and further enhancement thereof is expected in the future.

As an example of representative low-cost terminals, so-called wearable terminals may be exemplified. Wearable terminals are required to have low power consumption and highly reliable communication, and also large capacity communication in accordance with situations. In order to cover such application cases, the 3G PP started the standardization of Further Enhancement D2D (FeD2D) in 2016. Since wearable terminals are present close to users, a communication distance can be shortened and communication with low power consumption and highly reliable communication can be realized by using relay communication using terminals such as smartphones.

Figure 2:
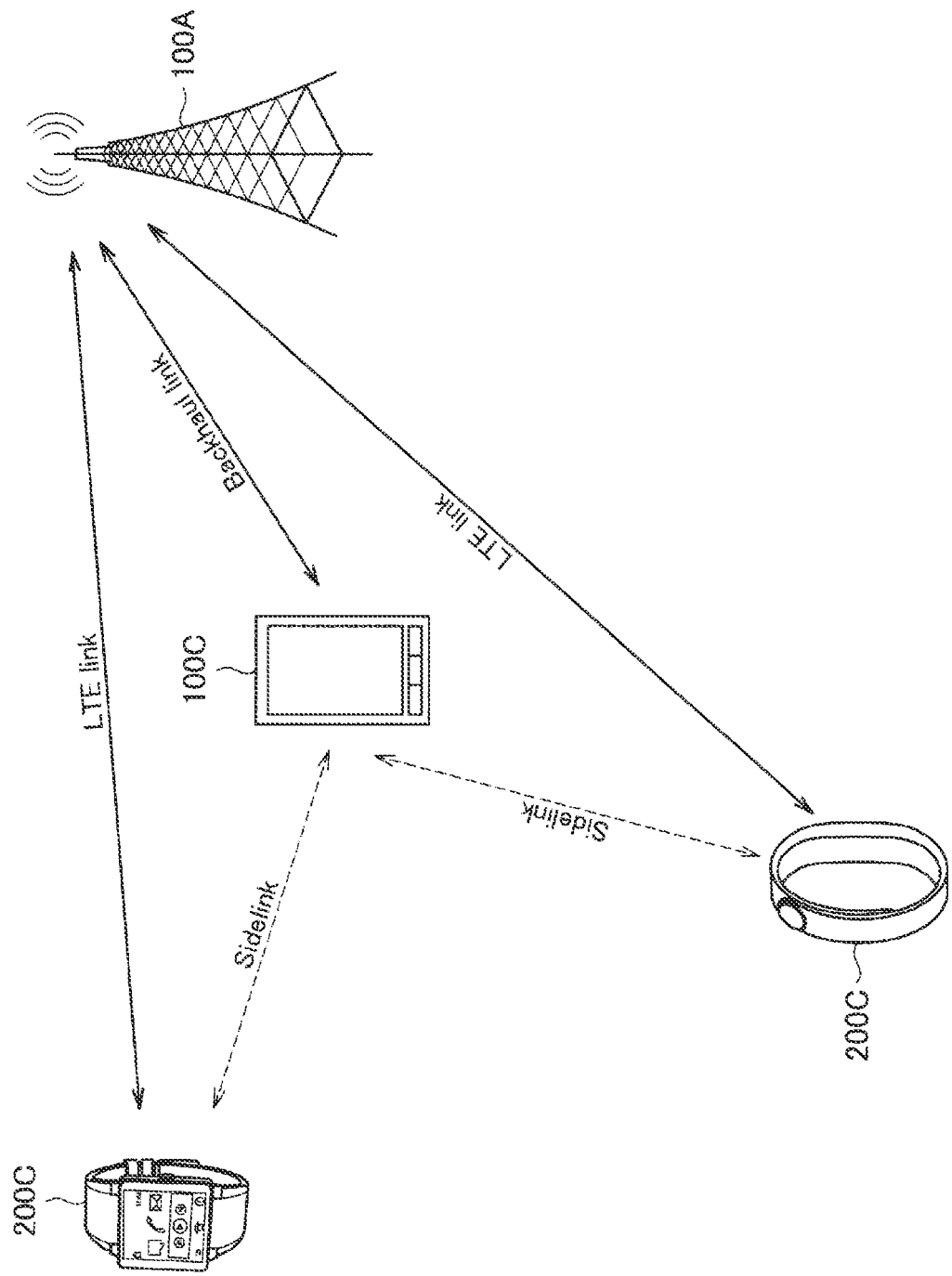
FIG. 2 is an explanatory diagram for describing an overview of communication via a relay terminal.

For example FIG. 2 is an explanatory diagram for describing an overview of communication via a relay terminal. A smartphone or the like held by a user, for example, can be assumed as a relay terminal 100C. In addition, a wearable terminal or the like, for example, can be assumed as a remote terminal 200C that performs communication with the base station 100A via the relay terminal 100C. The relay terminal 100C performs, for example, so-called LTE communication (which will also be referred to as "backhaul link communication" below) with the base station 100A, and on the other hand, performs sidelink communication with the remote terminal 200C. The remote terminal 200C performs communication with the base station 100A via the relay terminal 100C. In this case, the relay terminal 100C can be a communication device that relays communication between the remote terminal 200C and the base station 100A. In addition, the remote terminal 200C can also perform direction communication with the base station 100A.

Meanwhile, in relay communication between the remote terminal 200C such as a wearable terminal and the base station 100A, the presence of the relay terminal 100C is very important since the remote terminal 200C communicates with the base station 100A via the relay terminal 100C. However, since terminal devices that can operate like the relay terminal 100C are not fixedly present at all times, unlike the base station 100A, in most cases, it can be assumed that situations in which the terminal devices have difficulty in functioning as the relay terminal 110C may occur for various reasons. As a specific example, in a case in which a terminal device capable of operating as the relay terminal 100C is in a power off state due to lack of a battery, the terminal device will have difficulty in functioning as the relay terminal 100C. For this reason, realizing communication in which service continuity (Service continuity is secured and Quality of Service (QoS) is guaranteed even in such an unstable situation has become very Important. That is, in the case in which a terminal device capable of operating as the relay terminal 100 has difficulty in operating as the relay terminal 100C, how to continue stable communication is a key problem in relay communication.

With regard to this, a case in which, while the remote terminal 200C supports sidelink communication (through a PC5 interface) with the relay terminal 100C, the remote terminal also supports downlink (DL)/uplink (UL) communication (through a Uu interface) with the base station 100A is conceivable. In a case in which communication between the remote terminal 200C and the relay terminal 100C is difficult when such a configuration is used, for example, the following recovery methods are conceivable.

(a) Performing handover to another relay terminal 100C.
(b) Stopping relay communication and switching to direct communication with the base station 100A.

Figure 3:
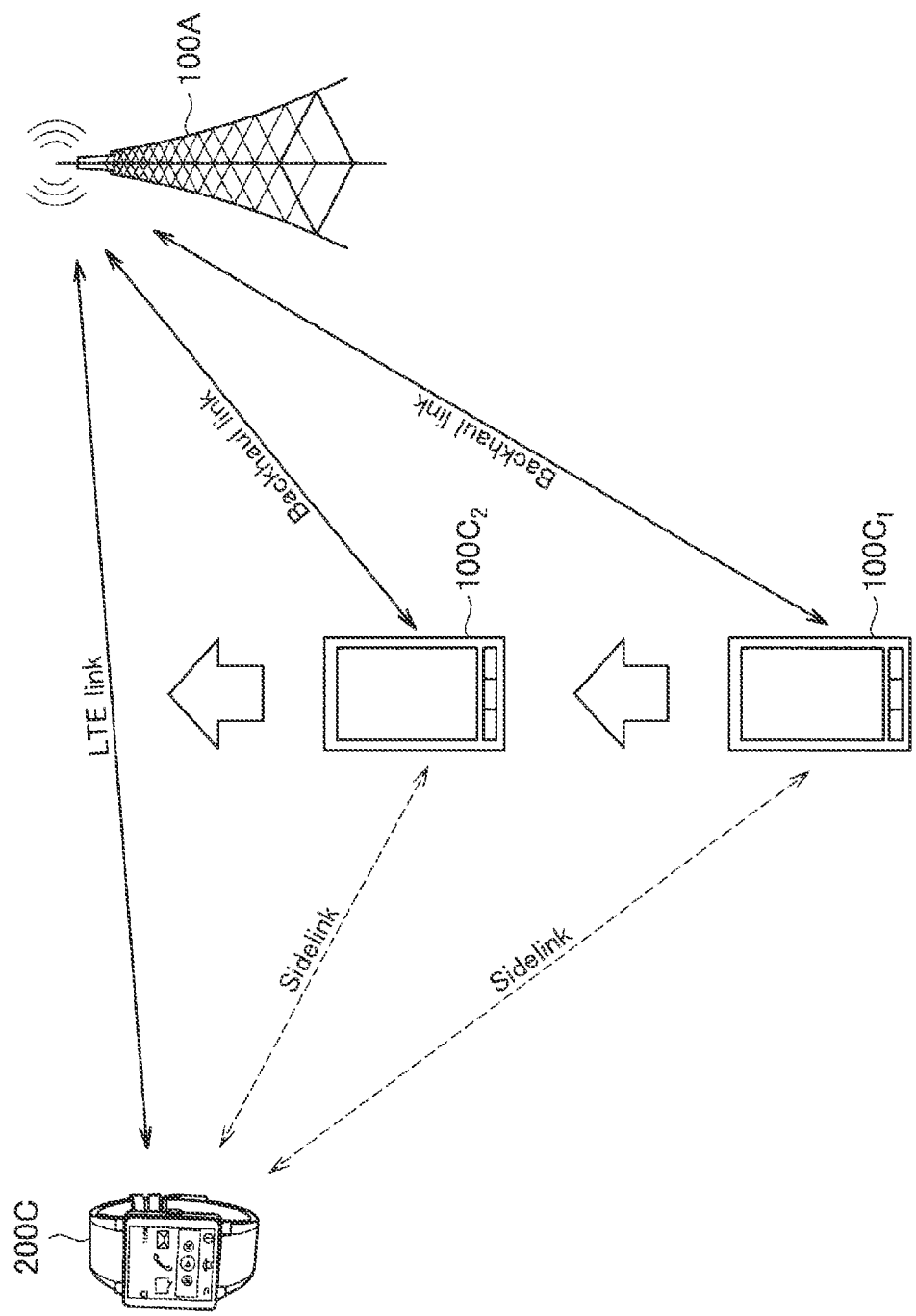
FIG. 3 is an explanatory diagram for describing an overview of a system according to the embodiment.

An example of the above-described recovery methods will be described below with reference to FIG. 3. FIG. 3 is an explanatory diagram for describing an overview of a system according to the present embodiment, illustrating an example of a recovery method in a case in which sidelink communication between a remote terminal 200C and a relay terminal 100C is difficult.

For example, it is assumed that communication between the remote terminal 200C and a relay terminal 100C becomes difficult in a situation in which the remote terminal 200C is performing relay communication with the base station 100A via the relay terminal 100C as illustrated in FIG. 3. In this case, for example, the communication between the remote terminal 200C and the base station 100A can be recovered on the basis of the recovery method introduced in (a) above by performing handover of relay communication via the relay terminal $100C_1$ to relay communication via another relay terminal $100C_2$. In addition, as another example, communication between the remote terminal 200C and the base station 100A can also be recovered on the basis of the recovery method introduced in (b) above such that the relay communication is stopped and the remote terminal 200C performs direct communication with the base station 100A.

However, in either of the recovery methods described in (a) and (b) above, a case in which service continuity may be impaired in the operation of the recovery made after the relay terminals 100C have difficulty in operating as a relay terminal can be assumed. Thus, it is desirable to have the recovery introduced in (a) or (b) described above performed before the relay terminals 100C have difficulty in operation. In addition, in the recovery method introduced in (a), it is desirable to make a smooth connection to the other relay terminal $100C_2$ serving as a switch destination at the time of handover. Particularly, a countermeasure for packet loss resulting from the handover is necessary.

Therefore, the present disclosure proposes an example of a new mechanism of Radio Link Monitoring (RLM) for relay communication (which will also be referred to as "mobile relay communication" below) in which a mobile communication terminal such as a so-called smartphone is used as a relay terminal and an example of a mechanism for handover assuming mobile relay communication.

2. CONFIGURATION EXAMPLE

Next, examples of functional configurations of a base station 100 and a terminal device 200 included in the system according to the present embodiment will be described.

<2.1. Configuration Example of Base Station>

Figure 4:
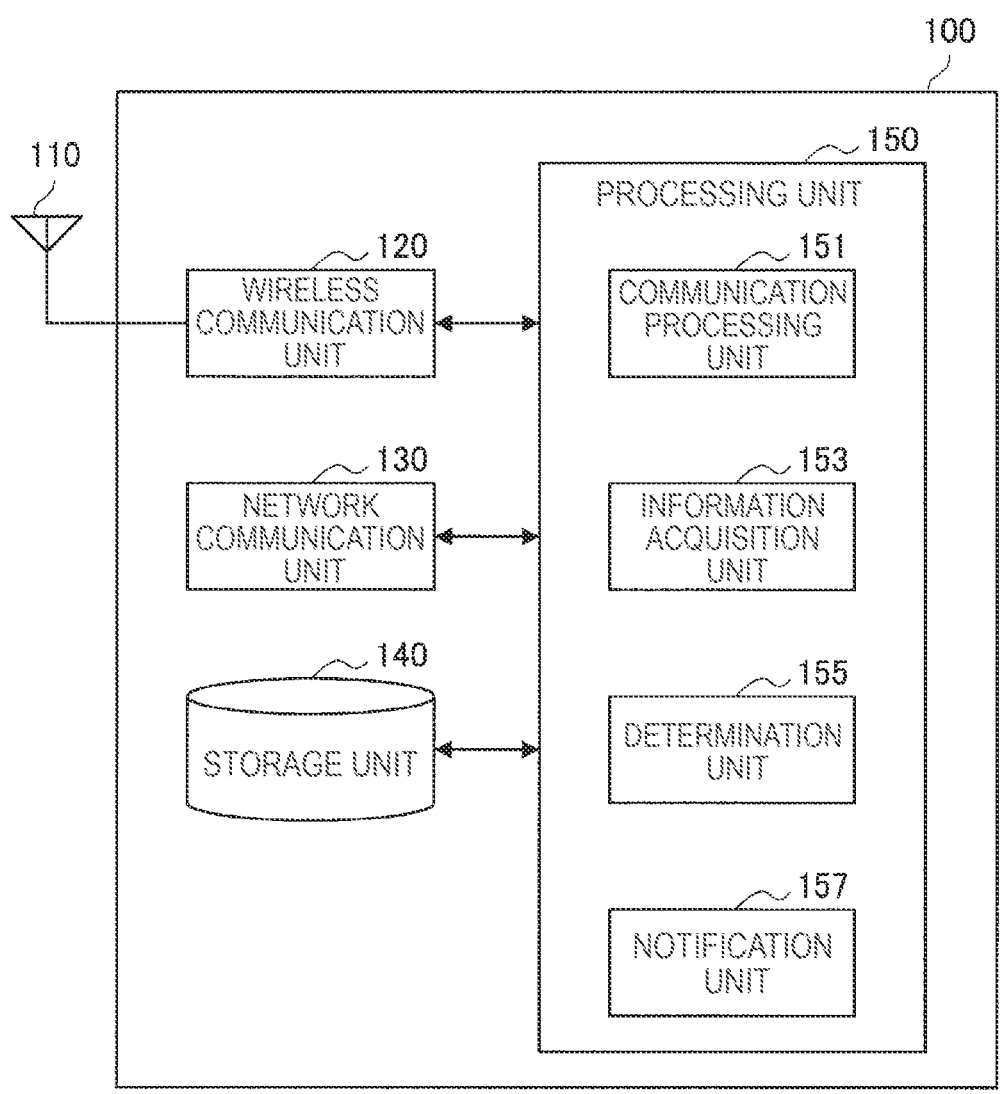
FIG. 4 is a block diagram illustrating an example of a configuration of a base station according to the embodiment.

First, a configuration of the base station 100 according to an embodiment of the present disclosure will be described with reference to FIG. 4. FIG. 4 is a block diagram illustrating an example of a configuration of the base station 100 according to an embodiment of the present disclosure. Referring to FIG. 4, the base station 100 includes an antenna unit 10, a wireless communication unit 120, a network communication unit 130, a storage unit 140, and a processing unit 150.

(1) Antenna Unit 110

The antenna unit 110 radiates a signal output by the wireless communication unit 120 as a radio wave into a space. In addition, the antenna unit 110 converts a radio wave in a space into a signal and outputs the signal to the wireless communication unit 120

(2) Wireless Communication Unit 120

The wireless communication unit 120 transmits and receives signals. For example, the wireless communication unit 120 transmits a downlink signal to a terminal device and receives an uplink signal from a terminal device.

In addition, in the system 1 according to the present embodiment, there may be a case in which a terminal device operates as a relay terminal (the wireless communication device 100C in FIG. 1) and relays communication between a remote terminal (the terminal device 200C in FIG. 1) and a base station as described above. In such a case, for example, the wireless communication unit 120 of the wireless communication device 100C corresponding to a relay terminal may transmit and receive sidelink signals to and from the remote terminal.

(3) Network Communication Unit 130

The network communication unit 130 transmits and receives information. For example the network communication unit 130 transmits information to another node and receives information from another node. The other node includes, for example, another base station and a core network node.

Note that, in the system 1 according to the present embodiment, there may be a case in which a terminal device operates as an operation as a relay terminal and relays communication between a remote terminal and a base station as described above. In such a case, for example, the wireless communication device 100C corresponding to the relay terminal may not have the network communication unit 130.

(4) Storage Unit 140

The storage unit 140 temporarily or permanently stores programs and various types of data for operations of the base station 100.

(5) Processing Unit 150

The processing unit 150 provides various functions of the base station 100. The processing unit 150 includes a communication processing unit 151, an information acquisition unit 153, a determination unit 155, and a notification unit 157. Note that the processing unit 150 can further include constituent elements other than these constituent elements. That is, the processing unit 150 can also perform an operation other than operations of the constituent elements.

Operations of the communication processing unit 151, the information acquisition unit 153, the determination unit 155, and the notification unit 157 will be described in detail below.

<2.2. Configuration Example of Terminal Device>

Figure 5:
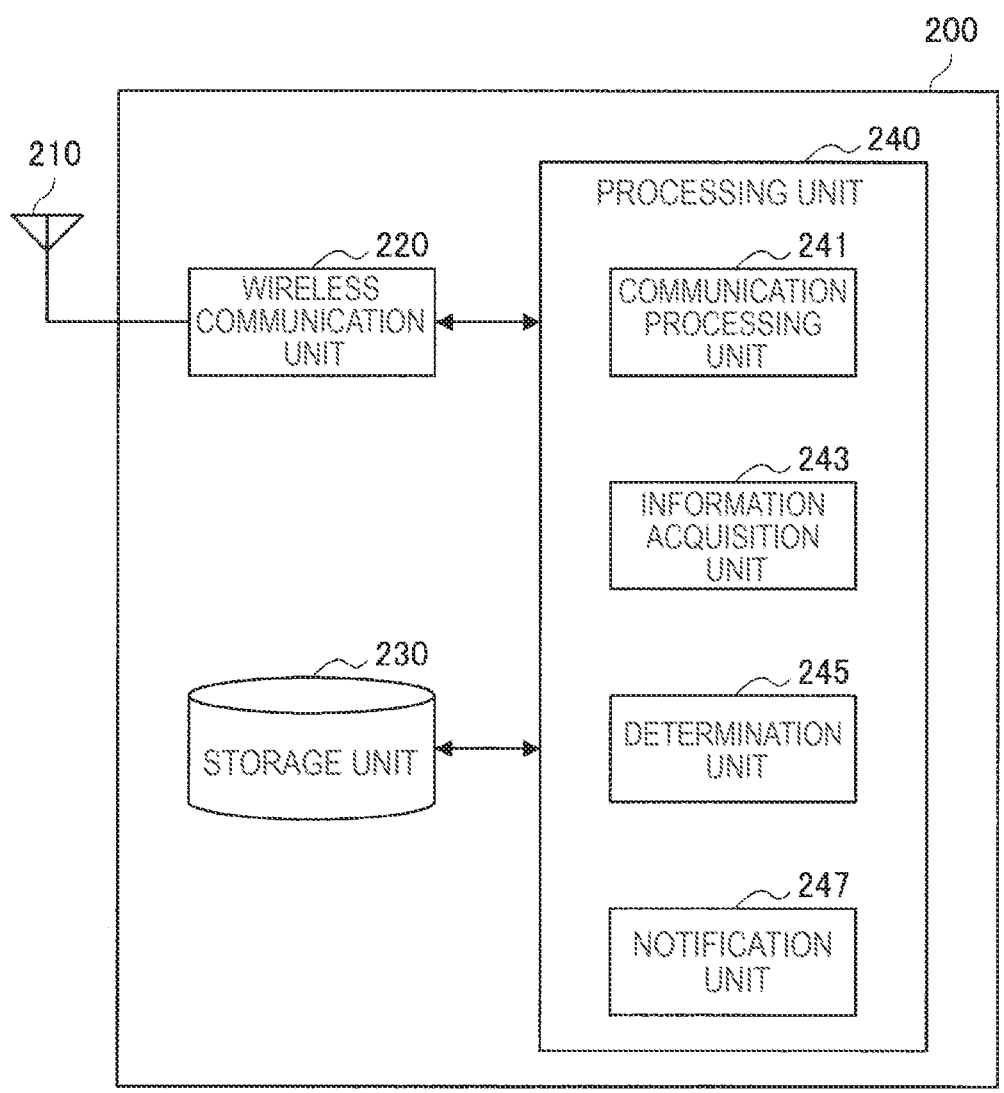
FIG. 5 is a block diagram illustrating an example of a configuration of a terminal device according to the embodiment.

Next, an example of a configuration of the terminal device 200 according to the embodiment of the present disclosure will be described with reference to FIG. 5. FIG. 5 is a block diagram illustrating an example of a configuration of the terminal device 200 according to the embodiment of the present disclosure. The terminal device 200 includes an antenna unit 210, a wireless communication unit 220, a storage unit 230, and a processing unit 240 as illustrated in FIG. 5.

(1) Antenna Unit 210

The antenna unit 210 radiates a signal output by the wireless communication unit 220 as a radio wave into a space. In addition, the antenna unit 210 converts a radio wave in a space into a signal and outputs the signal to the wireless communication unit 220.

(2) Wireless Communication Unit 220

The wireless communication unit 220 transmits and receives signals. For example, the wireless communication unit 220 receives a downlink signal from a base station and transmits an uplink signal to a base station.

In addition, in the system 1 according to the present embodiment, there are cases in which a terminal device operates as a relay terminal and relays communication between a remote terminal and a base station as described above. In such a case, for example, the wireless communication unit 220 of the terminal device 200C operating as a remote terminal may transmit and receive a sidelink signal to and from the relay terminal.

(3) Storage Unit 230

The storage unit 230 temporarily or permanently stores programs and various types of data for operations of the terminal device 200.

(4) Processing Unit 240

The processing unit 240 provides various functions of the terminal device 200. The processing unit 240 includes, for example, a communication processing unit 241, an information acquisition unit 243, a determination unit 245, and a notification unit 247. Note that the processing unit 240 can further include constituent elements other than these constituent elements. That is, the processing unit 240 can also perform an operation other than operations of the constituent elements.

Operations of the communication processing unit 241, the information acquisition unit 243, the determination unit 245, and the notification unit 247 will be described below in detail.

3. TECHNICAL FEATURES

Next, technical features of the present embodiment will be described.

<3.1. RLM Procedure>

Figure 6:
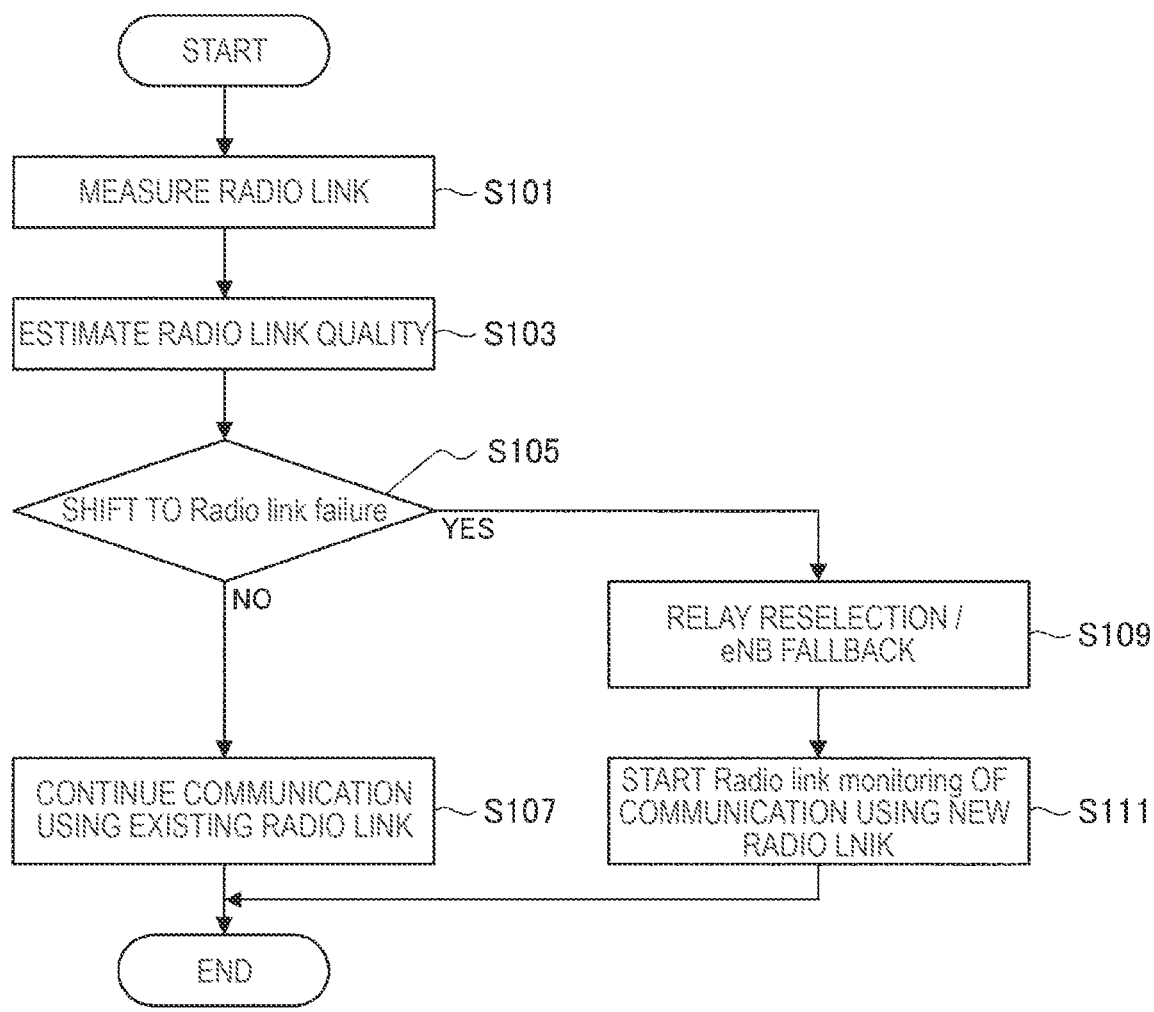
FIG. 6 is a flowchart showing an example of an RLM procedure according to the embodiment.

First, an overview of an RLM procedure assuming mobile relay communication in the system according to the present embodiment will be described with reference to FIG. 6. FIG. 6 is a flowchart showing an example of the RLM procedure according to the present embodiment. Note that, the present description will be provided focusing on an operation in which the terminal device 200C (which will also be referred to as a "remote terminal 200C" below) operating as a remote terminal executes RLM and switches a radio link to be used in communication with the base station 100A in accordance with the execution result.

First, the remote terminal 200C (the information acquisition unit 243) measures parameters relating to the communication quality (e.g., a power, an SN ratio, or the like) of a radio link, for example, a sidelink, a backhaul link, or the like (S101). Note that, the remote terminal 200C may acquire information indicating the measurement result from an external device. Next, the remote terminal 200C (the information acquisition unit 243) estimates the communication quality of the radio link on the basis of the measurement result for the parameters relating to the communication quality of the radio link (S103). The remote terminal 200C estimates the communication quality of the target radio link by, for example, comparing the measurement result with a predetermined threshold value. Note that details regarding details of the process of estimating the communication quality of a radio link will be separately described. In addition, the remote terminal 200C may acquire information indicating the estimation result from an external device. In addition, the information indicating the measurement result of the communication quality of the radio link and the information indicating the estimation result of the communication quality of the radio link corresponds to an example of "information regarding the communication quality."

Next, the remote terminal 200C (the determination unit 245) determines whether or not the state should shift to Radio Link Failure (RLF) on the basis of the estimation result of the communication quality (S105). For example, the remote terminal 200C may shift to RLF in a case in which the state of the estimation result of the communication quality having a value equal to or lower than the predetermined threshold value continues for a predetermined period of time or longer (in other words, a predetermined timer expires) Note that, details of RLF will be separately described below.

For example, in a case in which a shift to RLF is not made (NO in S105), the remote terminal 200C (the communication processing unit 241) continues the communication using the existing radio link (S107). Note that, in this case, the remote terminal 200C (the information acquisition unit 243) continues RLM with respect to the target radio link.

On the other hand, in a case in which a shift to RLF is decided (YES in S105), the remote terminal 200C (the communication processing unit 241) switches the radio link to be used in communication with the base station 100A (S109). As a specific example, the remote terminal 200C may switch the relay terminal 100C (used in relay communication with the base station 100A (i.e., perform reselection or handover). In addition, as another example, the remote terminal 200C may stop the relay communication via the relay terminal 100C and switch to direct communication with the base station 100A (which will also be referred to as "eNB fallback," or "fallback" below).

In addition, the remote terminal 200C (the communication processing unit 241) starts communication with the base station 100A using the new radio link switched to after the switching. In addition, the remote terminal 200C (the information acquisition unit 243) may start RLM targeting the new switched radio link (S111).

The overview of the RLM procedure assuming mobile relay communication in the system according to the present embodiment has been described above with reference to FIG. 6.

<3.2. RLM of Mobile Relay Communication>

Next, details of RLM of mobile relay communication will be described.

(1) Overview of RLM Targeting Cell

First, in order to make it easier to understand RLM of mobile relay communication, an overview of an example of RLM targeting a cell will be described. For example, a communication device serving as a subject of RLM executes monitoring of communication quality (i.e., RLM) targeting a serving cell in an RRC connected state. Here, the communication device shifts to RLF in a case in which, for example, the communication quality of a link subjected to RLM is degraded and it is determined that it is difficult to satisfy a predetermined level of reliability.

Figure 7:
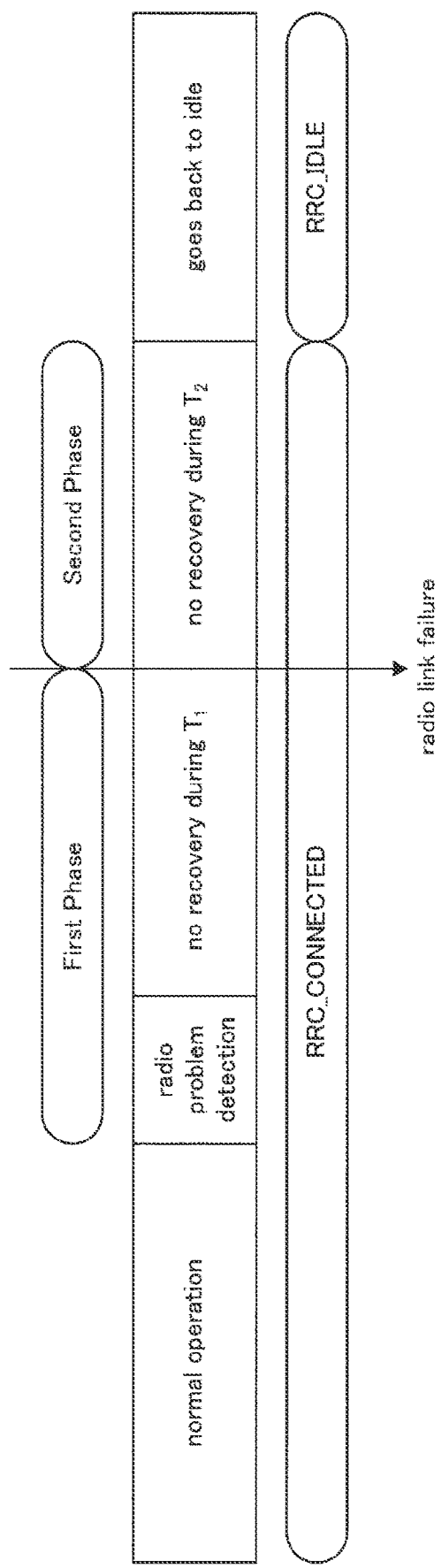
FIG. 7 is an explanatory diagram for describing an overview of RLF.

Here, RLF will be described with reference to FIG. 7. FIG. 7 is an explanatory diagram for describing an overview of RLF. As illustrated in FIG. 7, a shift to RLF is made in a case in which a problem (e.g., degradation of communication quality, etc.) is found in a radio link and a state of no recovery continues for a predetermined period of time (a period $T_1$ in FIG. 4) in a state in which a normal operation is being executed (First Phase).

Then, in a case in which a state of no recovery continues further for a predetermined period of time (a period $T_2$ in FIG. 4) (Second Phase) after the shift to RLF, the state transitions to an RRC idle mode. In this case, the communication device takes a measure of performing handover, cell reselection, or the like, for example, to set up a new link.

(2) RLM in Mobile Relay Communication

Next, RLM in mobile relay communication will be described. In an environment in which mobile relay communication is performed, each terminal device (i.e., the relay terminal 100C and the remote terminal 200C, continuously executes measurement of the communication quality of a predetermined radio link.

As a specific example, the relay terminal 100C may measure the communication quality of a downlink (i.e., a backhaul link) with the base station 100A. In addition, the relay terminal 100C may measure the communication quality of a sidelink (in other words, an access link) with the remote terminal 200C. In addition, the remote terminal 200C may measure the communication quality of a downlink from the base station 100A. In addition, the remote terminal 200C may measure the communication quality of the sidelink with the relay terminal 100C.

Note that a series of radio links for relay communication between the remote terminal 200C and the base station 100A via the relay terminal 100C (i.e., the sidelink and the backlink) corresponds to an example of a "second radio link." In addition, the radio link of the second radio link for communication between the remote terminal 200C and the relay terminal 100C (i.e., the sidelink) corresponds to an example of a "third radio link." In addition, the radio link of the second radio link for communication between the relay terminal 100C and the base station 100A (i.e., the backhaul link) corresponds to an example of a "fourth radio link." Note that a radio link for direct communication between the remote terminal 200C and the base station 100A (i.e., a Uulink) corresponds to an example of a "first radio link."

Next, an example of a method of measuring the communication quality of each of radio links will be described below with respect to each radio link. As a specific example, a cell-specific reference signal (CRS) is used in measurement of the communication quality of a downlink.

In addition, a reference signal unique to a relay (i.e., relay-specific reference signal), for example, is used in measurement of the communication quality of a sidelink. This can be realized by using a demodulation reference signal (DMRS) or CRS which has been corrected for a relay terminal or the like. As a more specific example, a reference signal unique to a relay of a relay terminal may be generated by using identification information of the relay terminal.

Next, an example of a method of estimating the communication quality of each radio link will be described. Each terminal device estimates the communication quality of each radio link on the basis of a measurement result after the communication quality of the radio link is measured.

The estimation of the communication quality of a downlink is determined on the basis of, for example, the criterion of whether or not reliable communication is possible via the downlink (e.g., whether PDCCH BLER is equal to or lower than 10%, equal to or lower than 2%, or the like).

In addition, in mobile relay communication, it is also necessary to consider the communication quality of the sidelink between the relay terminal 100C and the remote terminal 200C, without being limited only to the communication quality of the downlink between the relay terminal 100C and the base station 100A. Particularly, it is necessary for the remote terminal 200C to estimate the communication quality of the sidelink with the relay terminal 100C and the communication quality of the backhaul link between the relay terminal 100C and the base station 100A, in addition to the communication quality of the downlink between the relay terminal 100C and the base station 100A.

For example, examples of final evaluation results of the backhaul link and the sidelink in accordance with states of the communication quality thereof and countermeasures for such cases are summarized below. In the following table, "o" indicates a case in which there is no problem in communication reliability, and "x" indicates a case in which there is a problem in communication reliability.

TABLE 1

| Case | Backhaul link | Sidelink | Final link evaluation | Countermeasures |
|---|---|---|---|---|
| Case 1 | ○ | ○ | ○ | None |
| Case 2 | x | ○ | x | eNB handover (for the relay terminal and the remote terminal at the same time) Reselection of the relay terminal |
| Case 3 | ○ | x | x | eNB fallback Reselection of the relay terminal |
| Case 4 | x | x | x | eNB handover eNB fallback |

(3) Estimation of Communication Quality of Backhaul Link

Next, an example of a technique of estimating the communication quality of a backhaul link will be described. It has been agreed with regard to a UE-to-network relay for public safety defined in Release 13 of the 3GPP that the strength of a backhaul link of a relay u will not be taken into account in relay selection/reselection. Thus, selection of a relay terminal is performed only on the basis of the communication quality of a link of PC5. An example of a technique of estimating the communication quality of a backhaul link with respect to each of a remote terminal, a relay terminal, and a base station on the basis of the above-described premise will be described below.

(3-1) Case in which Communication Quality of Backhaul Link is Estimated on Remote Terminal Side First, an example of a case in which the remote terminal 200C estimates the communication quality of the backhaul link will be described.

(Communication Quality Estimation Method)

As a specific example, the remote terminal 200C estimates the communication quality of the backhaul link between the relay terminal 100C and the base station 100A by monitoring the backhaul link. Particularly, since it is anticipated that the remote terminal 200C and the relay terminal 100C are located in a relatively close distance in mobile relay communication, the remote terminal 200C is considered to relatively easily estimate the communication quality of the backhaul link between the relay terminal 100C and the base station 100A as described above.

Note that, a criterion of the remote terminal 200C (the information acquisition unit 243) for estimating the communication quality of the backhaul link is different from that of the remote terminal 200C for estimating the communication quality of the downlink with the base station 100A. Specifically, the criterion (threshold value) for determining whether the communication quality of the backhaul link has been degraded or improved is set such that the determination can be made on the basis of a smaller change in the communication quality than in the case of the criterion (threshold value) for determining the communication quality of the downlink.

As a specific example. Qout_q and Qin_q, which will be described below, are exemplified as criteria used to estimate the quality of downlink communication. Qout_q and Qin_q can be set in accordance with criteria Qout and Qin for evaluating whether radio link quality indicates in-synchronization (in-sync) or out-of-synchronization (out-of-sync). Specifically, Qout_q corresponds to a criterion (threshold value) indicating the poorness of the communication quality and is used to evaluate, for example, whether or not the communication quality of downlink communication no longer reaches a predetermined level of quality. In addition, Qin_q corresponds to a criterion (threshold value) indicating the goodness of the communication quality and is used to evaluate, for example, whether or not the communication quality of downlink communication reaches the predetermined level of quality.

Figure 9:
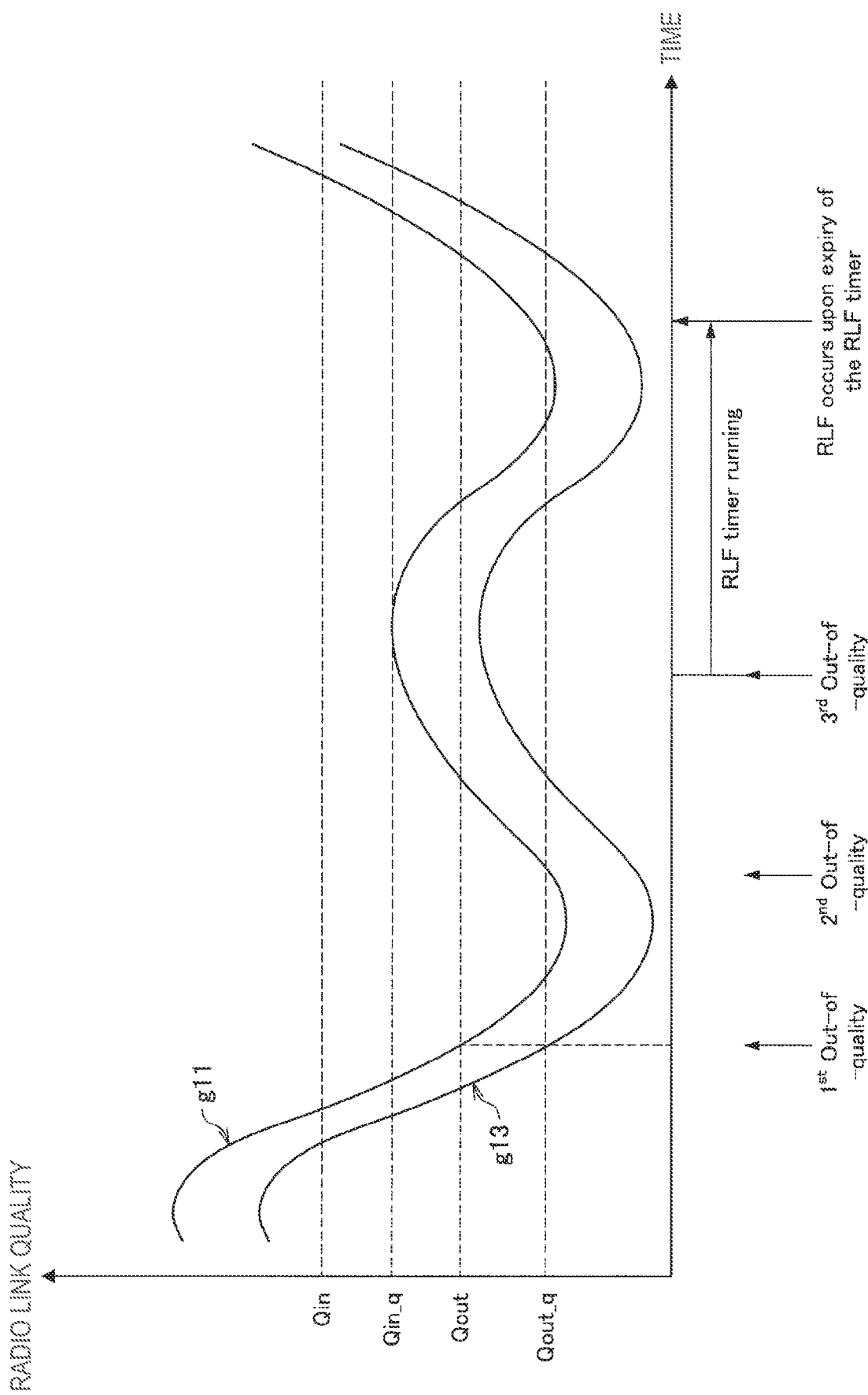
FIG. 9 is an explanatory diagram for describing an example of temporal change in radio link quality of a remote terminal and a relay terminal and each of in-synchronization and out-of-synchronization states of the remote terminal.
Figure 10:
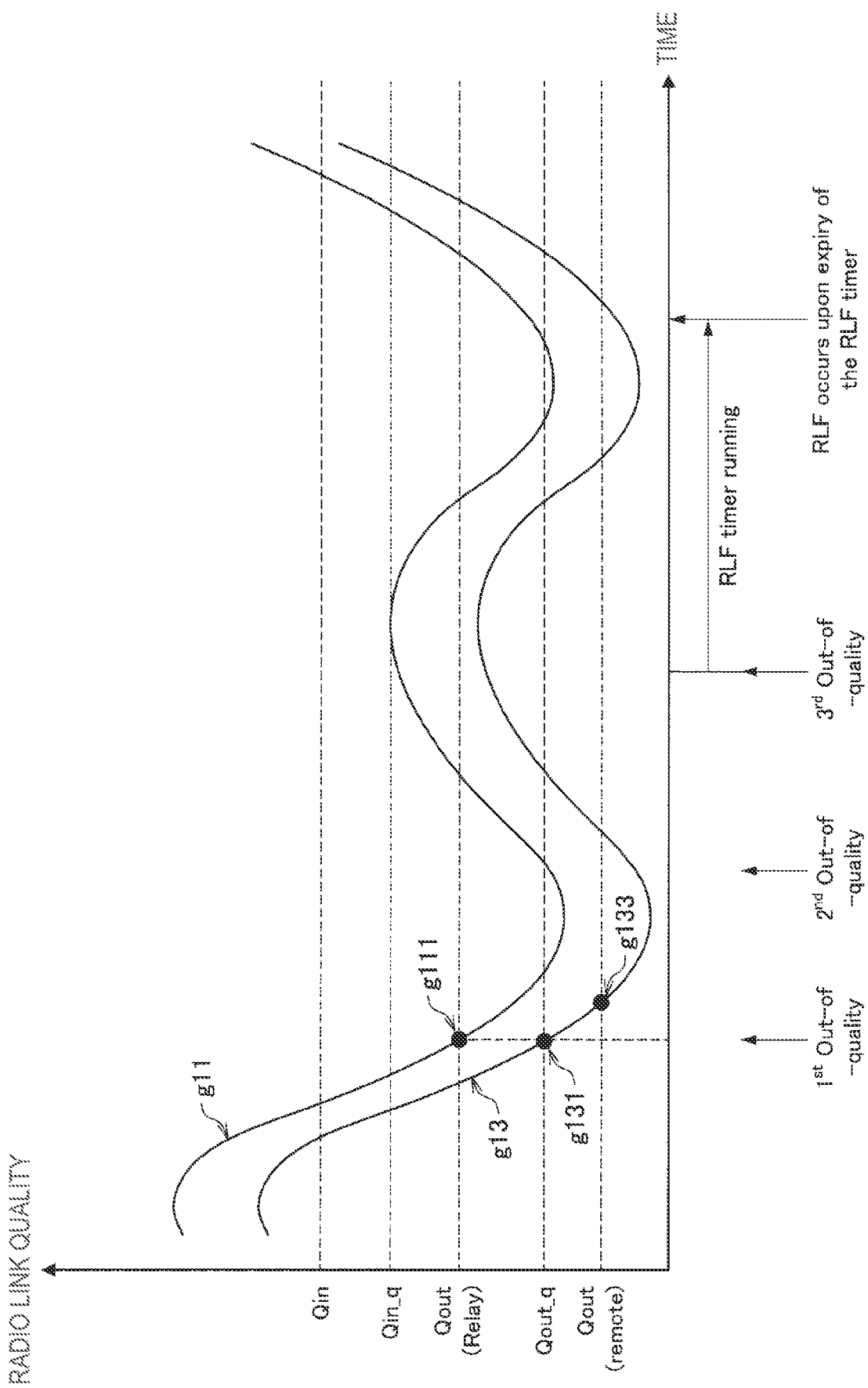
FIG. 10 is an explanatory diagram for describing another example of temporal change in radio link quality of the remote terminal and the relay terminal and each of in-synchronization and out-of-synchronization states of the remote terminal.

Here, an example of the criterion of the remote terminal 200C for estimating the communication quality of the backhaul link will be described in detail with reference to FIGS. 8 to 10.

Whether or not radio link quality indicates in-synchronization (in-sync) or out-of-synchronization (out-of-sync) is evaluated through comparison of radio link quality of a downlink and threshold values. For the threshold values, the threshold value Qin that is used to determine in-synchronization (in-sync) and a threshold value Qout that is used to determine out-of-synchronization (out-of-sync) are set.

Figure 8:
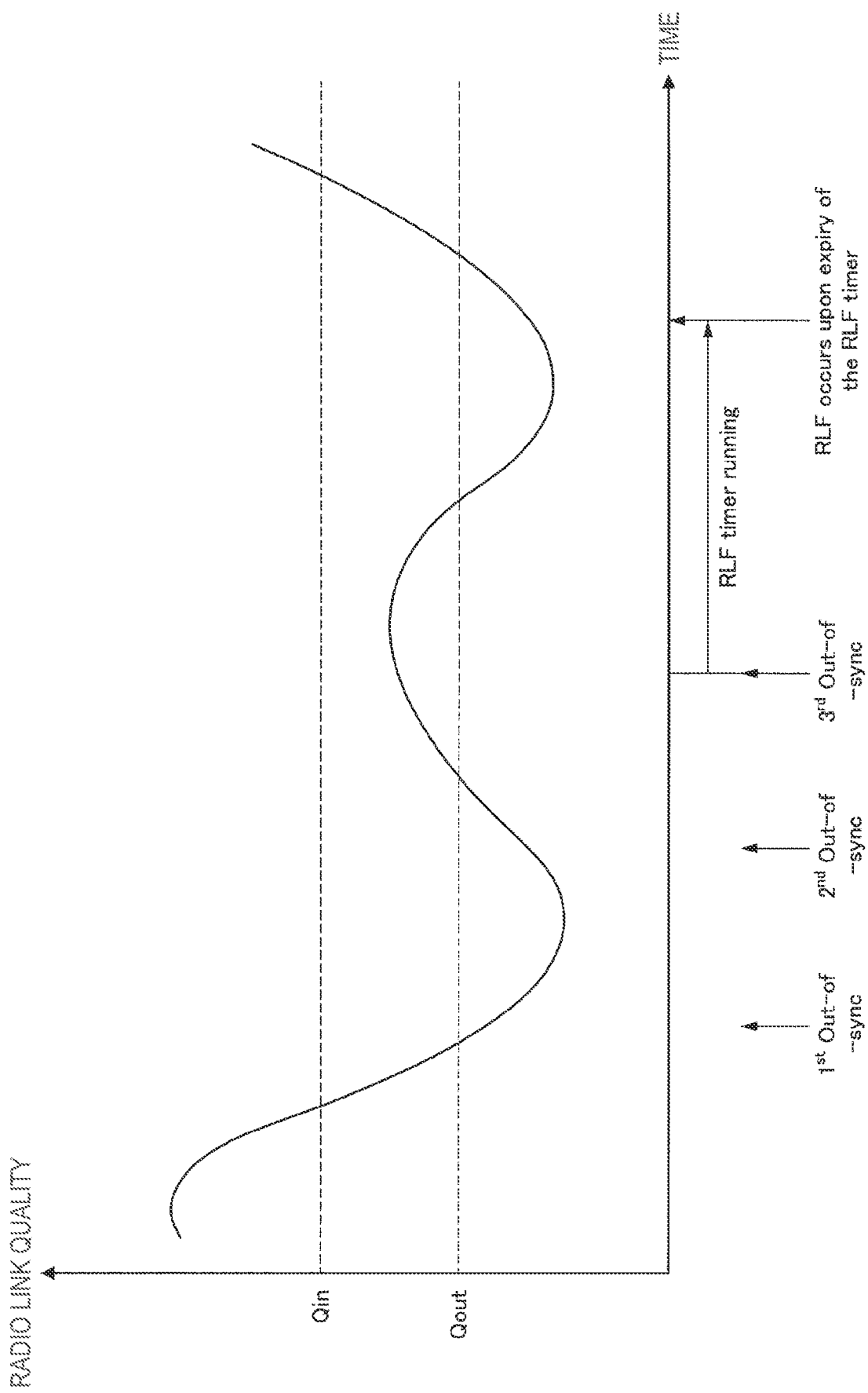
FIG. 8 is an explanatory diagram for describing an example of temporal change in radio link quality and respective states of in-synchronization and out-of-synchronization.

For example, FIG. 8 is an explanatory diagram for describing an example of temporal change in radio link quality and respective states of in-synchronization and out-of-synchronization. In FIG. 8, an example of a case in which a transition is made from an in-synchronization (in-sync) state to an out-of-synchronization (out-of-sync) state is illustrated. Specifically, in a case in which the radio link quality becomes lower than the threshold value Qout, a physical layer of a terminal device reports out-of-synchronization (out-of-sync) to an upper layer. In a case in which the radio link quality does not exceed the threshold value Qin at the next evaluation timing, the physical layer of the terminal device reports out-of-synchronization (out-of-sync, to the upper layer. In a case in which out-of-synchronization (out-of-sync) is continuously reported a predetermined number of times (N310, N313) set using a parameter relating to Radio Link Failure (RLF), the upper layer determines that there is a problem in the physical layer and starts an RLF timer (T310, T313). In a case in which in-synchronization (in-sync) is continuously reported a predetermined number of times (N311, N314) set using a parameter relating to RLF before the RLF timer expires, the upper layer determines that the problem of the physical layer has been recovered and stops the RLF timer (T310, T313). Meanwhile, in a case in which the RLF timer has expired, RLF occurs, and the terminal device withdraws from an RRC connection (RRC_CONNECTED) mode or re-establishes connection. In addition, in a case in which the RLF timer (T310) of a primary cell has expired, transmission power of the terminal device is turned off within 40 ms. In addition, in a case in which the RLF timer (T313) of a primary secondary cell has expired, transmission power of the primary secondary cell is turned off within 40 ms.

The threshold value Qout is defined at, for example, a level corresponding to 10% of a block error rate of virtual PDCCH transmission considering a PCFICH error. In addition, the threshold Qin is defined at, for example, a level corresponding to 2% of a block error rate of virtual PDCCH transmission with more satisfactory reception quality than the threshold value Qout considering a PCFICH error.

The terminal device measures the radio link quality of all radio frames at predetermined time intervals in addition, in a case in which a discontinuous reception (DRX) mode is set, the terminal device may measure the radio link quality of all DRX intervals at predetermined time intervals.

As the predetermined time interval for evaluation of the radio link quality by the terminal device, each of a time interval $T_{Evaluate\_Q_m}$ for evaluating in-synchronization (in-sync) and a time interval $T_{Evaluate\_Q_{out}}$ for evaluating out-of-synchronization (out-of-sync) is defined individually.

The time interval $T_{Evaluate\_Q_{out}}$ is a minimum measurement interval defined for evaluating out-of-synchronization (out-of-sync), and a predetermined period (e.g., 200 ms), a length of a DRX cycle, or the like, for example, can be set. Note that the above-described example is a minimum interval, and the terminal device may perform measurement through a longer period than the above-described example.

The time interval $T_{Evaluate\_Q_m}$ is a minimum measurement interval defined for evaluating in-synchronization (in-sync), and a predetermined period (e.g., 100 ms), a length of a DRX cycle, or the like, for example, can be set. Note that the above-described example is a minimum interval, and the terminal device may perform measurement through a longer period than the above-described example.

A period for reporting of in-synchronization (in-sync) and out-of-synchronization (out-of-sync) can be set to at least 10 ms (1 radio frame).

Next, estimation of the quality of the backhaul link with respect to the remote terminal will be described in detail with reference to FIG. 9. FIG. 9 is an explanatory diagram for describing an example of temporal change in the radio link quality of a remote terminal and a relay terminal and each of in-synchronization and out-of-synchronization states of the remote terminal. In FIG. 9, reference numeral g11 represents the measurement result of the communication quality of the backhaul link by the relay terminal. In addition, reference numeral g13 represents the measurement (estimation) result of the communication quality of the backhaul link of the relay terminal by the remote terminal.

In a case in which the quality of the backhaul link of the relay terminal is measured by the remote terminal, a case in which the remote terminal is not in synchronization with the backhaul link is conceivable, and thus determination is made on the basis of whether radio link quality is equal to or higher than a predetermined quality rather than using a parameter indicating whether radio link quality indicates in-synchronization (in-sync) or out-of-synchronization (out-of-sync). Here, each of the cases is defined as in-quality (In-quality) and out-of-quality (Out-of-quality). In the example illustrated in FIG. 9, an example in which the quality of the backhaul link of the relay terminal with respect to the remote terminal transitions from in-quality to out-of-quality is illustrated. Note that, at this moment, the relay terminal simultaneously performs measurement of the quality of the backhaul link in addition, the quality measurement is executed using the above-described in-sync and out-of-sync.

The threshold values Qin_q and Qout_q for in-quality and out-of-quality are set to values at which whether the quality of the backhaul link of the relay terminal is in-sync or out-of-sync can be estimated on the remote terminal side. For example, Qin_q and Qout_q may be set for threshold values Qin and Oout of the relay terminal on the basis of a predetermined offset value. In addition, as another example, Qin_q and Qout_q may also be directly set with respect to the remote terminal.

More specifically, Qout_q is set such that the threshold value Qout of the relay terminal can be estimated on the remote terminal side. Thus, in FIG. 9, for example, in a case in which the measurement result of the backhaul link of the communication quality on the relay terminal side is equal to or lower than Qout as shown at the timing of the 1$^{st}$ out-of-sync, it is desirable to set Qout_q even on the remote terminal side such that the estimation result of the backhaul link of the communication quality is equal to or lower than Qout_q.

In addition, Qin and Qout for evaluating out-of-synchronization and in-synchronization of a radio link (i.e., a downlink) with a base station may be set on the remote terminal side, separately from the criteria Qin_q and Qout_q for estimating the communication quality of the backhaul link with the relay terminal. For example FIG. 10 is an explanatory diagram for describing another example of temporal change in radio link quality of the remote terminal and the relay terminal and each of n m-synchronization and out-of-synchronization states of the remote terminal. Note that, it is assumed in FIG. 10 that reference numerals g11 and g13 represent graphs in which similar reference numerals of FIG. 9 are given. In addition, in the example illustrated in FIG. 10, Qout_q is set such that the measurement result of the communication quality on the remote terminal side is equal to or lower than Qout_q at the timing of the 1$^{st}$ out-of-sync at which the measurement result of the communication quality is equal to or lower than Qout on the relay terminal side, similarly to the example illustrated in FIG. 9.

As described above, a value different from Qout for evaluating whether the remote terminal is the out-of-synchronization state in the downlink may be set for Qout_q. Specifically, Qout_q may be set such that a transition to the out-of-quality state is made at a higher communication quality than the communication quality at which a transition to the out-of-synchronization state is made for the downlink on the basis of the Qout (i.e., a lower value corresponding to BLER than Qout is set) as illustrated in FIG. 10. Accordingly, in a case in which the communication quality of the backhaul link has deteriorated (g111), the evaluation (g131) based on the threshold value Qout_q set for the backhaul link is executed earlier than the evaluation (g133) based on Qout that is the threshold set for the downlink. In addition, Qin_q may be set such that a transition to the in-quality state of the remote terminal is made at a lower communication quality than the communication quality at which a transition to the in-synchronization state is made for the downlink on the basis of the Qin (i.e., a higher value corresponding to BLER than Qin is set). Accordingly, in a case in which the communication quality of the backhaul link has been improved, the evaluation based on the threshold value Qin_q set for the backhaul link is executed earlier than the evaluation based on Qin that is the threshold value set for the downlink.

Note that description has been provided above focusing on the measurement of the communication quality of the backhaul link. Meanwhile, since there are cases in which synchronization is not taken between the terminal devices also with respect to measurement (estimation) of communication quality of the sidelink, measurement (estimation) of communication quality may be executed using the parameters of in-quality and out-of-quality. However, parameters of in-synchronization (in-sync) and out-of-synchronization (out-of-sync) can be substituted for the parameters of in-quality and out-of quality.

In addition, a criterion (threshold value) for estimating (determining) the communication quality of the backhaul link by the remote terminal 200C may be set to a plurality of stages. As a more specific example, the threshold value may be set to three stages of low, medium, and high.

In addition, the base station 100A, for example, may notify the remote terminal 200C of a criterion (threshold value) for the remote terminal 200C to estimate (determine) the communication quality of the backhaul link. In this case, the base station 100A may notify the remote terminal 200C of information indicating the criterion, for example, on the basis of RRC signaling. In addition, as another example, the criterion (threshold value) may be pre-configured in the remote terminal 200C.

In addition, a criterion (threshold value) for estimating (determining) the communication quality of the backhaul link by the remote terminal 200C may be set through calculation performed by the remote terminal 200C itself. In this case, the remote terminal 200C may calculate the threshold value for estimating the communication quality of the backhaul link (which will also be referred to as a "threshold value for the backhaul link" below) on the basis of, for example, a threshold value for estimating the communication quality of a downlink (which will also be referred to as a "threshold value for a downlink" below) set for itself.

As a more specific example, the remote terminal 200C may calculate the threshold value for the backhaul link by multiplying the threshold value for a downlink by a weight. Note that the weight may be calculated on the basis of parameters, for example, a distance between the remote terminal 200C and the relay terminal 100C, reception power (path loss), and the like.

(Setting of Timer)

In addition, the remote terminal 200C may set a new timer for estimating the communication quality of the backhaul link. This timer can be used to, for example, detect RLF of the backhaul link. In addition, a value different from that of a timer used to detect RLF of a downlink set in the remote terminal 200C may be set for this timer.

The example in which the remote terminal 200C estimates the communication quality of the backhaul link has been described above.

(3-2) Case in which Communication Quality of Backhaul Link is Estimated on Relay Terminal Side Next, an example of a case in which the relay terminal 100C estimates the communication quality of the backhaul link and notifies the remote terminal 200C of the estimation result will be described.

(Communication Quality Estimation Method)

First, an example of a method of the relay terminal 100C to estimate the communication quality of the backhaul link (i.e., the radio link with the base station 100A) will be described. For example, the relay terminal 100 (the information acquisition unit 153) may estimate the communication quality of the backhaul link on the basis of a criterion (threshold value) set to estimate communication quality of a downlink (i.e., the backhaul link).

In addition, as another example, the relay terminal 100C may set a new criterion (threshold value) for estimating the communication quality of the backhaul link. Note that, the new criterion is used when, for example, the relay terminal 100C (the notification unit 157) notifies the remote terminal 200C of the estimation result of communication quality of the backhaul link. In addition, a value different from that of the criterion for estimating communication quality of the downlink set in the relay terminal 100C may be set as the new criterion. In addition, in this case, the base station 100A may notify the relay terminal 100C of the new criterion. Specifically, the base station 100A may notify the relay terminal 100C of information indicating the new criterion (threshold value) on the basis of, for example RRC signaling. In addition, as another example the new criterion (threshold value) may be pre-configured in the relay terminal 100C.

(Notification Method for Estimation Result of Communication Quality)

Next, an example of a method for the relay terminal 100C (the notification unit 157) to notify the remote terminal 200C of information regarding the estimation result of the communication quality of the backhaul link will be described.

For example, the relay terminal 100C may notify the remote terminal 200C of information indicating the estimation result of the communication quality of the backhaul link itself in addition, as another example, the relay terminal 100C may quantize the estimation result of the communication quality of the backhaul link and notify the remote terminal 200C of the estimation result. As a specific example, the relay terminal 100C may compare the measurement result of the communication quality of the backhaul link with a predetermined threshold value and notify the remote terminal 200C of information indicating the communication quality or information indicating the level of the communication quality (e.g., being high/medium/low). In addition, the relay terminal 100C may give such notification to the remote terminal 200C only in a case in which, for example, the communication quality of the backhaul link is equal to or lower than a predetermined level of quality.

In addition, the relay terminal 100C may notify the remote terminal 200C of various types of additional information, in addition to the estimation result of the communication quality of the backhaul link. As a specific example, the relay terminal 100C may notify the remote terminal 200C of information indicating a measurement environment of the communication quality. Note that, as information to indicating a measurement environment of the communication quality, for example, information indicating a measurement time, resources used for the measurement, an antenna port to be measured, or the like is exemplified. In addition, the relay terminal 100C may set a period (i.e., a validity period) on which an estimation result of the communication quality of the backhaul link can be reflected and notify the remote terminal 200C of information indicating the validity period. As a specific example, the relay terminal 100C may set 10 subframes of the period after the notification is received as a validity period, and in this case, may notify the remote terminal 200C of 10 subframes of the validity period. Note that, although the case in which the relay terminal 100C notifies the remote terminal 200C of information regarding the communication quality of the backhaul link has been focused on and described above, the remote terminal 200C may notify the relay terminal 200C of information regarding the communication quality of the backhaul link.

(Link and Resource for Notification)

Next, an example of radio links and resources used by the relay terminal 100C to notify the remote terminal 200C of information regarding an estimation result of communication quality of the backhaul link will be described.

The relay terminal 100C may directly notify the remote terminal 200C of information regarding an estimation result of the communication quality of the backhaul link, for example, by using a sidelink. In this case, a resource pool for the notification may be set by the base station 100A (the communication processing unit 151) or the relay terminal 100C (the communication processing unit 151). In addition, the base station 100A may notify the remote terminal 200C of information regarding the resource pool, for example, on the basis of RRC signaling. In addition, as another example, the relay terminal 100C may notify the remote terminal 200C of the information regarding the resource pool on the basis of RRC signaling. In addition, at this time, the relay terminal 100C may notify the remote terminal 200C of the information regarding the resource pool using broadcast information (Physical Sidelink Broadcast Channel or PSBCH). In addition, as another example, the information regarding the resource pool may be pre-configured in the remote terminal 200C.

In addition, as another example, the relay terminal 100C may indirectly notify the remote terminal 200C of information regarding an estimation result of the communication quality of the backhaul link via the base station 100A. In this case, the relay terminal 100C may notify the base station 100A of information regarding the estimation result of the communication quality of the backhaul link, for example, on the basis of RRC signaling. In addition, the base station 100A may notify the remote terminal 200C of the information notified from the relay terminal 100C, for example, on the basis of RRC signaling.

(Notification Timing)

Next, an example of a timing at which the relay terminal 100C (the notification unit 157) notifies the remote terminal 200C of information regarding an estimation result of the communication quality of the backhaul link will be described.

In a case in which an estimation result of the communication quality of the backhaul link exceeds a predetermined criterion (threshold value), for example, the relay terminal 100C may notify the remote terminal 200C of information regarding the estimation result of the communication quality. As a more specific example, the relay terminal 100C may notify the remote terminal 200C of the information in a case in which a shift to RLF is estimated on the basis of the estimation result of the communication quality of the backhaul link. Note that, the base station 100A may notify the relay terminal 100C of information indicating a criterion (threshold value) for determining an estimation result of the communication quality of the backhaul link, for example, on the basis of RRC signaling. In addition, as another example, the information indicating the criterion (threshold value) may be pre-configured in the relay terminal 100C.

In addition, as another example, the base station 100A may set a notification to timing with respect to the relay terminal 100C. As a specific example, the base station 100A may schedule notification timings such that information indicating an estimation result of the communication quality of the backhaul link is semi-statically notified (semi-persistent scheduling). In this case, the base station 100A may set a resource pool for performing reporting to the relay terminal 100C. In addition, the base station 100A may set a report timing and a report interval with respect to the relay terminal 100C. For example, a report timing may be set with respect to the relay terminal 100C by informing the relay terminal 100C of offset information with respect to a reference point. In addition, the base station 100A may perform activation/deactivation of a report using downlink control information (DCI). In addition, as another example, the base station 100A may schedule a notification timing such that information indicating an estimation result of the communication quality of the backhaul link is dynamically notified (i.e., the scheduling may be instructed to the relay terminal 100C). Note that a report timing and a report interval may be pre-configured in the relay terminal 100C.

(Setting of Timer)

In addition, the relay terminal 100C may set a new timer for estimating the communication quality of the backhaul link. This timer can be used to, for example, detect RLF of the backhaul link. In addition, a value different from that of a timer used to detect RLF of a downlink set in the relay terminal 100C may be set for the aforementioned timer.

The example of the case in which the relay terminal 100C estimates the communication quality of the backhaul link and notifies the remote terminal 200C of the estimation result has been described above.

(3-3) Case in which Communication Quality of Backhaul Link is Estimated on Base Station Side Next, an example of a case in which the base station 100A estimates the communication quality of the backhaul link and notifies the remote terminal 200C of the estimation result will be described.

In this case, for example, the base station 100A may measure the communication quality of an uplink signal from the relay terminal 100C and estimate the communication quality of the backhaul link on the basis of the measurement result. Note that, at this time, the base station 100A may measure the communication quality of the uplink using, for example, at least one of a physical uplink shared channel (PUSCH), a physical uplink control channel (PUCCH), or a sounding reference signal (SRS) for the uplink signal.

The example of the case in which the base station 100A estimates the communication quality of the backhaul link and notifies the remote terminal 200C of the estimation result has been described above.

(4) Estimation of Communication Quality of Sidelink

Next, an example of a technique of estimating the communication quality of the sidelink will be described. The remote terminal 200C or the relay terminal 100C estimates the communication quality of the sidelink and determines a shift to RLF (i.e., detection of RLF) In accordance with the estimation result. At this time, the remote terminal 200C or the relay terminal 100C may determine a shift to RLF taking the above-described estimation result of the communication quality of the backhaul link into consideration. Thus, examples of the technique of estimating the communication quality of the sidelink will be described below with respect to cases in which the remote terminal 200C performs RLM of the sidelink and the relay terminal 100C performs RLM of the sidelink.

(4-1) Case in which Remote Terminal 200C Performs RLM of Sidelink

First, an example of a case in which the remote terminal 200C performs RLM of the sidelink, that is, estimates the communication quality of the sidelink and determines a shift to RLF in accordance with the estimation result will be described.

(Criterion for Estimating Communication Quality)

The remote terminal 200C (the information acquisition unit 253) may set, for example, a new criterion (threshold value) for estimating the communication quality of the sidelink. Note that the new criterion may be set, for example, directly by the base station 100A to the remote terminal 200C. In this case, the base station 100A may notify the remote terminal 200C of information indicating the new criterion (threshold value), for example, on the basis of RRC signaling.

In addition, as another example, the relay terminal 100C may set the new criterion (threshold value) for estimating the communication quality of the sidelink with respect to the remote terminal 200C. In this case, for example, the base station 100 may notify the remote terminal 200C of the information indicating the new criterion (threshold value) via the relay terminal 100C. Note that, in a case in which the relay terminal 100C notifies the remote terminal 200C of the information indicating the new criterion (threshold value), new RRC signaling for the notification from the relay terminal 100C may be set. In addition, the relay terminal 100C may notify the remote terminal 200C of the information indicating the new criterion (threshold value) using broadcast information (PSBCH).

In addition, as another example, a new criterion (threshold value) for estimating the communication quality of the sidelink may be pre-configured in the remote terminal 200C.
(Resource Pool for Measuring Communication Quality)

In addition, a new resource pool to be used in the measurement of the communication quality of the sidelink may be set for the remote terminal 200C. For example, the base station 100A may set the resource pool and directly notify the remote terminal 200C of information regarding the resource pool via the downlink. In this case, the base station 100A may notify the remote terminal 200C of the information regarding the resource pool, for example, on the basis of RRC signaling.

In addition, as another example, the base station 100 may indirectly notify the remote terminal 200C of the information regarding the resource pool to be used in the measurement of the communication quality of the sidelink via the relay terminal 100C. Note that, in a case in which the relay terminal 100C notifies the remote terminal 200C of the information regarding the resource pool, new RRC signaling for the notification from the relay terminal 100C may be set. In addition, the relay terminal 100C may notify the remote terminal 200C of the information regarding the resource pool using broadcast information (PSBCH).

Figure 11:
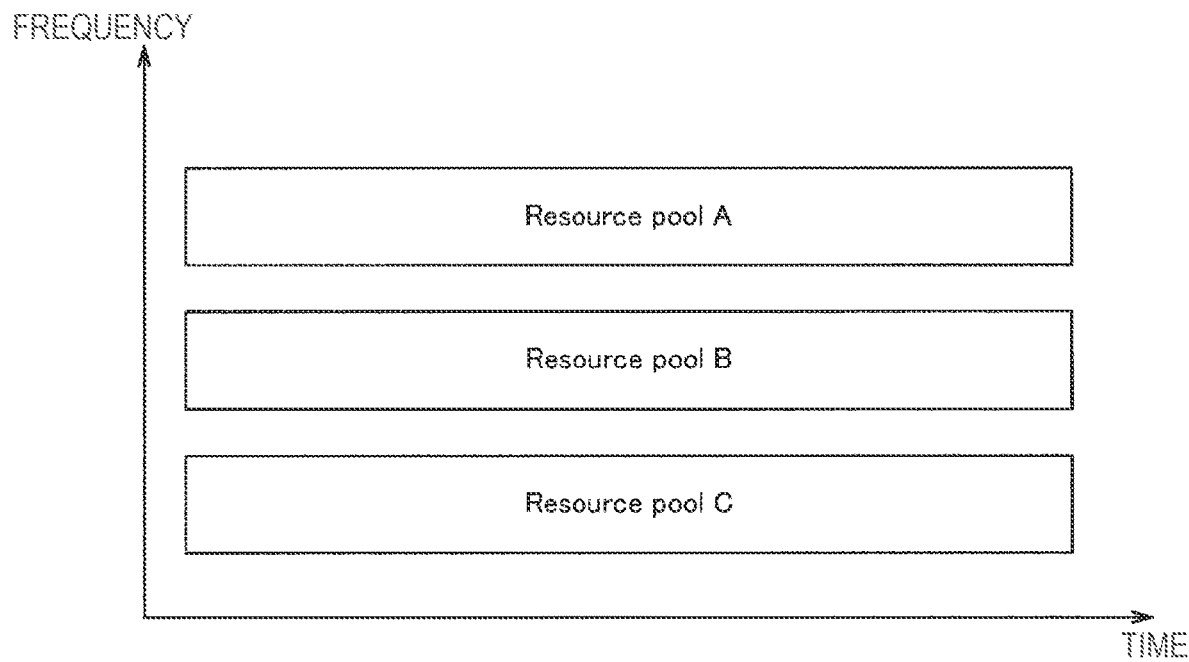
FIG. 11 is an explanatory diagram for describing an example of a setting of resource pools to be used in measurement of a communication quality of a sidelink.
Figure 12:
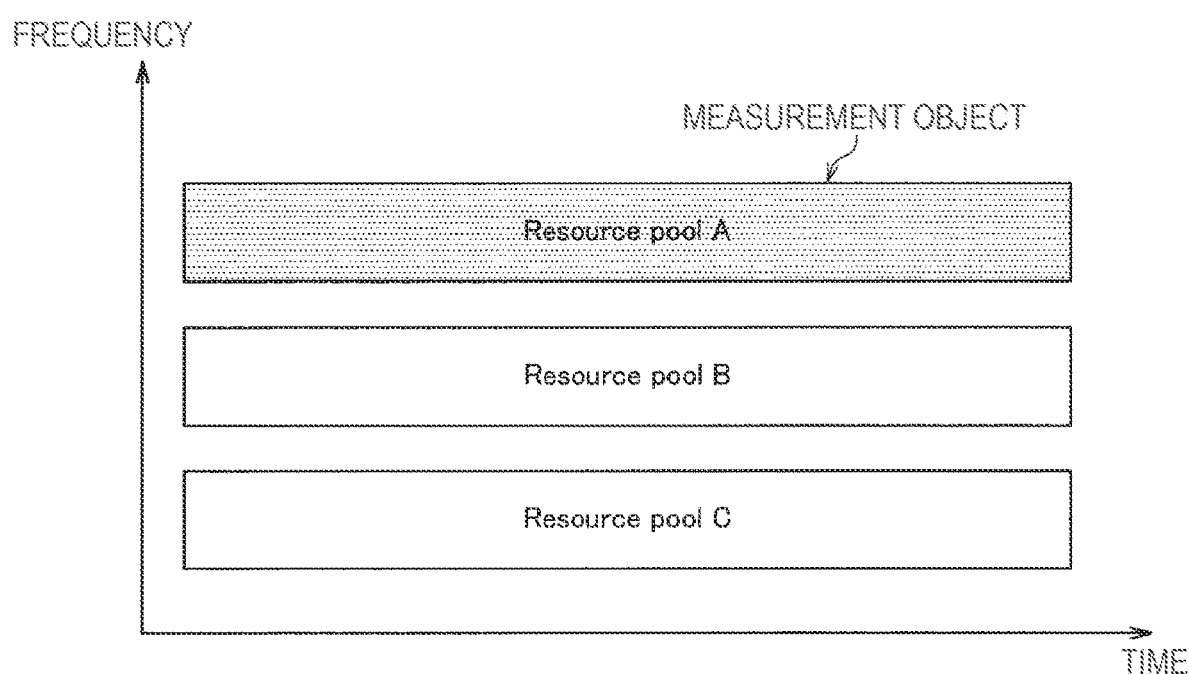
FIG. 12 is an explanatory diagram for describing an example of a setting of resource pools to be used in measurement of a communication quality of a sidelink.

Note that, as the resource pool to be used in the measurement of the communication quality of the sidelink, for example, one or more resource pools among a plurality of resource pools may be set. For example FIGS. 11 and 12 are explanatory diagrams for describing an example of setting resource pools to be used in the measurement of the communication quality of the sidelink. In the example of FIG. 11, a plurality of resource pools A to C are set. On this premise, for example, the resource pool A is set as a resource pool that is a measurement object for measuring the communication quality of the sidelink, as illustrated in FIG. 12.

Figure 13:
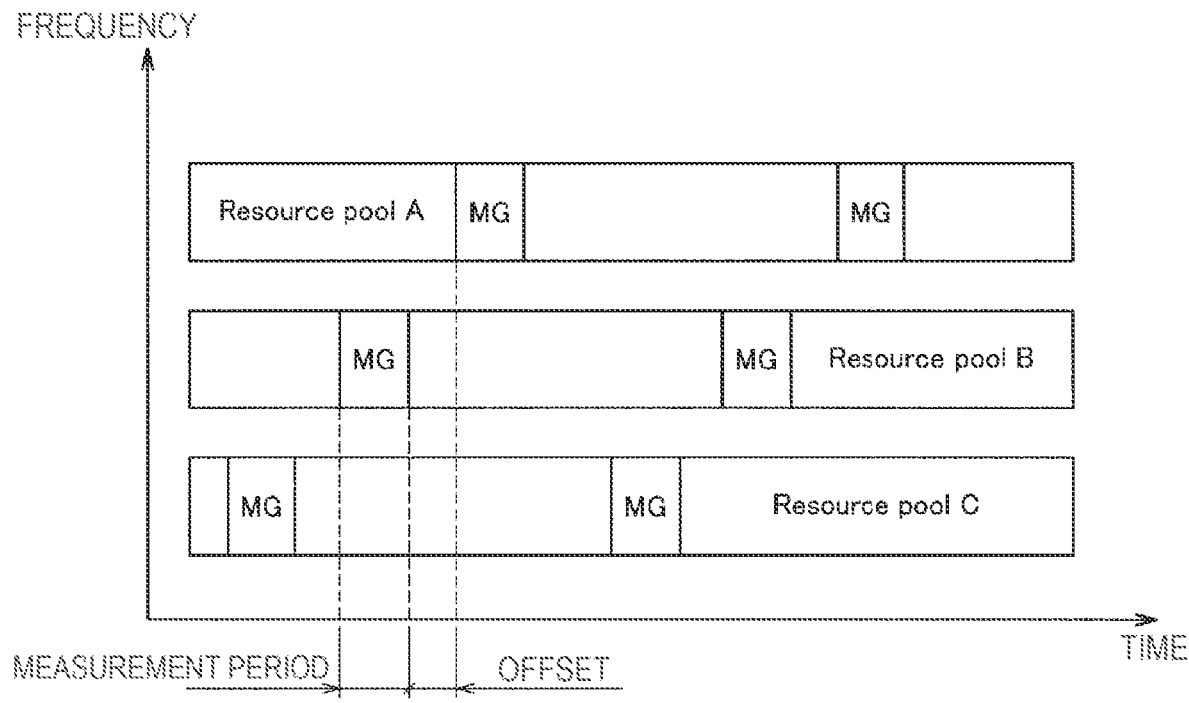
FIG. 13 is an explanatory diagram for describing another example of the setting of resource pools to be used in measurement of a communication quality of a sidelink.

In addition, as another example, the measurement of the communication quality of the sidelink may be performed through the plurality of resource pools. For example FIG. 13 is an explanatory diagram for describing another example of setting resource pools to be used in the measurement of the communication quality of the sidelink. In FIG. 13, the periods denoted by reference signal MG represent gap periods set for each resource pool for the measurement of the communication quality of the sidelink (resource pool measurement gaps). Specifically, each of the gap periods MG are set between the plurality of resource pools that are measurement objects of the communication quality (in other words, monitoring objects) in a time division manner for each of the plurality of resource pools. At this time, offsets are set between the gap periods adjacent to each other in time series. On the basis of this configuration, information regarding the communication quality of the sidelink is acquired by measuring the communication quality of the sidelink in each of the gap periods MG and then integrating a series of the measurement results.

Note that, information regarding the gap periods MG illustrated in FIG. 13, that is, information regarding a length of the gap period (i.e., a measurement period), an offset value, and the like may be set by, for example, the base station 100A or the relay terminal 100C.

With this configuration, the communication quality is measured intermittently in the example illustrated in FIG. 13, for example, in a case in which attention is paid to a certain resource pool. Thus, it is possible to prevent the certain resource pool from being occupied for a relatively long period of time of several hundred milliseconds for the measurement of the communication quality and further the resource pool from not being used for the period. In addition, since the communication quality of a plurality of resource pools is measured, it is possible to expect, for example, the effect of frequency diversity. Note that, the examples described with reference to FIGS. 11 to 13 can also be applied to a case in which either of the base station 100A and the relay terminal 100C sets a resource pool.

The example of the case in which the remote terminal 200C performs RLM of the sidelink, that is, communication quality of the sidelink is estimated and determination of a shift to RLF is made in accordance with the estimation result, has been described above.

(4-2) Case in which Relay Terminal 100C Performs RLM of Sidelink

Next, an example of a case in which the relay terminal 100C performs RLM of the sidelink will be described.
(Criterion for Estimating Communication Quality)

For example, the relay terminal 100C (the information acquisition unit 153) may set a new criterion (threshold value) for estimating the communication quality of the sidelink. Note that the new criterion may be set by, for example, the base station 100A for the relay terminal 100C. In this case, the base station 100A may notify the relay terminal 100C of information indicating the new criterion (threshold value), for example, on the basis of RRC signaling.

In addition, as another example, the relay terminal 100C itself may set a new criterion (threshold value) for estimating the communication quality of the sidelink. In this case, the relay terminal 100C may set the new criterion (threshold value) by using, for example, the terminal category (UE Category) information and the like of the relay terminal 100C or the remote terminal 200C.

In addition, as another example, a new criterion (threshold value) for estimating the communication quality of the sidelink may be pre-configured in the relay terminal 100C.
(Recourse Pool for Measuring Communication Quality)

In addition, a new resource pool to be used in the measurement of the communication quality of the sidelink may be set for the relay terminal 100C. For example, the base station 100A may set the resource pool and notify the relay terminal 100C of information regarding the resource pool via the downlink. In this case, the base station 100A may notify the relay terminal 100C of the information regarding the resource pool, for example, on the basis of RRC signaling.

In addition, similarly to the case in which the remote terminal 200C performs RLM of the sidelink one or more resource pools among a plurality of resource pools, for example, may be set as resource pools to be used in the measurement of the communication quality of the sidelink (see FIGS. 11 and 12). In addition, the measurement of the communication quality of the sidelink may be performed through the plurality of resource pools (wee FIG. 13).

The example of the case in which the relay terminal 100C performs RLM of the sidelink has been described above.
(4-3) Feedback on Information Regarding Communication Quality of Sidelink to Base Station In any of the above-described cases in which the remote terminal 200C performs RLM of the sidelink and the relay terminal 100C performs RLM of the sidelink, information indicating the measurement result or the estimation result of the communication quality of the sidelink (which will also be referred to as "information regarding the communication quality of the sidelink" below) may be fed back to the base station 100A. Thus, an example of each of cases in which each of the remote terminal 200C and the relay terminal 100C feeds the information regarding the communication quality of the sidelink back to the base station 100A will be described below.

(Case in which Relay Terminal Gives Feedback on Information Regarding Communication Quality)

First, an example of a case in which the relay terminal 100C gives feedback on information regarding communication quality of the sidelink to the base station 100A will be described.

For example, the base station 100A may schedule a feedback timing such that the relay terminal 100C semi-statically gives feedback on information regarding communication quality of the sidelink. In this case, the base station 100A may set a resource pool for giving a report to the relay terminal 100C. In addition, the base station 100A may set a report timing and a report interval with respect to the relay terminal 100C. A report timing may be set with respect to the relay terminal 100C by, for example, informing the relay terminal 100C of offset information with respect to a reference point. In addition, the base station 100A may perform activation/deactivation of reporting using DCI. Note that a report timing and a report interval may be pre-configured in the remote terminal 200C.

In addition, as another example, the base station 100A may schedule a feedback timing such that information regarding the communication quality of the sidelink is dynamically fed back (i.e., the scheduling may be instructed to the relay terminal 100C). In this case, for example, the base station 100A may cause the relay terminal 100C to give feedback on information regarding the communication quality of the sidelink by dynamically allocating resources for the feedback using DCI.

(Case in which Remote Terminal Gives Feedback on Information Regarding Communication Quality)

Next, an example of a case in which the remote terminal 200C gives feedback on information regarding communication quality of the sidelink to the base station 100A will be described.

(Direct Feedback to Base Station)

The remote terminal 200C may give feedback on information regarding the communication quality of the sidelink directly to the base station 100A, for example, by using a directly link (Uu link) to the base station 100A.

As a specific example, the base station 100A may schedule a feedback timing such that the remote terminal 200C semi-statically gives feedback on information regarding communication quality of the sidelink. In this case, the base station 100A may set a resource pool for giving a report to the remote terminal 200C. In addition, the base station 100A may set a report timing and a report interval with respect to the remote terminal 200C. A report timing may be set with respect to the remote terminal 200C by, for example, informing the remote terminal 200C of offset information with respect to a reference point. In addition, the base station 100A may perform activation/deactivation of reporting using DCI. Note that a report timing and a report interval may be pre-configured in the remote terminal 200C.

In addition, as another example, the base station 100A may schedule a feedback timing such that information regarding the communication quality of the sidelink is dynamically fed back (i.e., the scheduling may be instructed to the remote terminal 200C). In this case, for example, the base station 100A may cause the remote terminal 200C to give feedback on information regarding the communication quality of the sidelink by dynamically allocating resources for the feedback using DCI.

(Indirect Feedback Via Relay Terminal)

In addition, the remote terminal 200C may indirectly give feedback on information regarding the communication quality of the sidelink to the base station 100A via the relay terminal 100C. Note that. In this case, communication from the relay terminal 100C to the base station 100A is performed similarly to the method of the relay terminal 100C giving the feedback on the information to the base station.

In addition, the base station 100A may schedule a feedback timing such that the remote terminal 200C semi-statically gives feedback on information regarding communication quality of the sidelink to the relay terminal 100C. In this case, the base station 100A may set a resource pool for giving a report to the remote terminal 200C. In addition, the relay terminal 100C may set a report timing and a report interval with respect to the remote terminal 200C. A report timing may be set with respect to the remote terminal 200C by, for example, informing the remote terminal 200C of offset information with respect to a reference point. In addition, the relay terminal 100C may perform activation deactivation of reporting using sidelink control information (SCI). Note that a report timing and a report interval may be pre-configured in the remote terminal 200C.

In addition, as another example, a feedback timing for the remote terminal 200C may be scheduled such that the information regarding the communication quality of the sidelink is dynamically fed back. In this case, for example, by dynamically allocating resources for the feedback using SCI, the relay terminal 100C may cause the remote terminal 200C to give feedback on the information regarding the communication quality of the sidelink.

(4-4) Setting of Timer

In addition, in any of the above-described cases in which the remote terminal 200C performs RLM of the sidelink and the relay terminal 100C performs RLM of the sidelink, a new timer for estimating the communication quality of the sidelink may be set. This timer can be used to, for example, detect RLF of the sidelink. In addition, a value different from that of a timer used to detect RLF of the downlink set in the relay terminal 100C or the remote terminal 200C may be set for the aforementioned timer.

(5) Requirements of RLM

Next, requirements of RLM for the system according to the present embodiment will be described below.

A situation in which a terminal device 200 calculates a communication quality of a radio link without performing sufficient RLM can be assumed depending on a setting situation of discontinuous reception (DRX) or a resource pool configuration. Thus, in a case in which the number of subframes in which the terminal device 200 can measure a communication quality is limited, it is desirable to set a necessary minimum period for the measurement.

On the assumption of such a situation, in the system 1 according to the present embodiment, for example, a minimum time (which will also be referred to as a "minimum RLM measurement time" below) for measuring the communication quality in RLM may be set for the remote terminal 200C or the relay terminal 100C. Note that, a minimum RLM measurement time may be set by the base station 100A or the relay terminal 100C for the remote terminal 200C. In addition, a minimum RLM measurement time may be set by the base station 100A for the relay terminal 100C. In addition, as another example, a minimum RLM measurement time may be pre-configured in at least one of the remote terminal 200C or the relay terminal 100C.

Figure 14:
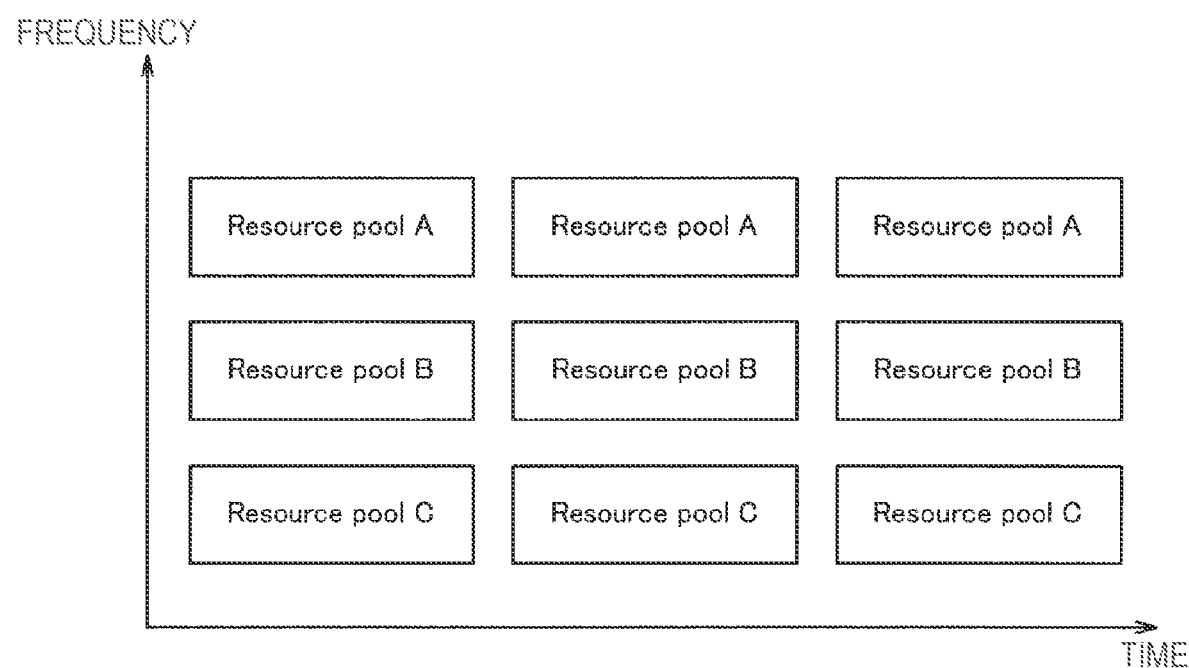
FIG. 14 is an explanatory diagram for describing an example of a case in which a temporally discontinuous resource pool is set.

Note that, as cases in which a minimum RLM measurement time is set, a case in which DRX is set, a case in which an RRM measurement gap is set, a case in which a temporally discontinuous resource pool is set, and the like are exemplified. For example FIG. 14 is an explanatory diagram for describing an example of the case in which a temporally discontinuous resource pool is set. That is, in the example illustrated in FIG. 14, each of resource pools A to C is discontinuous in time series.

The requirements of RLM for the system according to the present embodiment have been described above.

<3.3. Handover and Reselection in Mobile Relay Communication>

Next, handover and reselection in mobile relay communication according to the present embodiment will be described.

(1) Overview on Handover and Reselection in Mobile Relay Communication

In mobile relay communication, for example, a situation in which the relay terminal 100C is more unstable than in relay communication via a normal fixed relay such as the wireless communication device 100B illustrated in FIG. 1 can be assumed. Taking such a situation into account, a measure to maintain service continuity at all times is necessary in accordance with a situation of the relay terminal 100C in mobile relay communication. That is, new handover and reselection for mobile relay communication are necessary Therefore, the handover and reselection for mobile relay communication will be described below.

Figure 15:
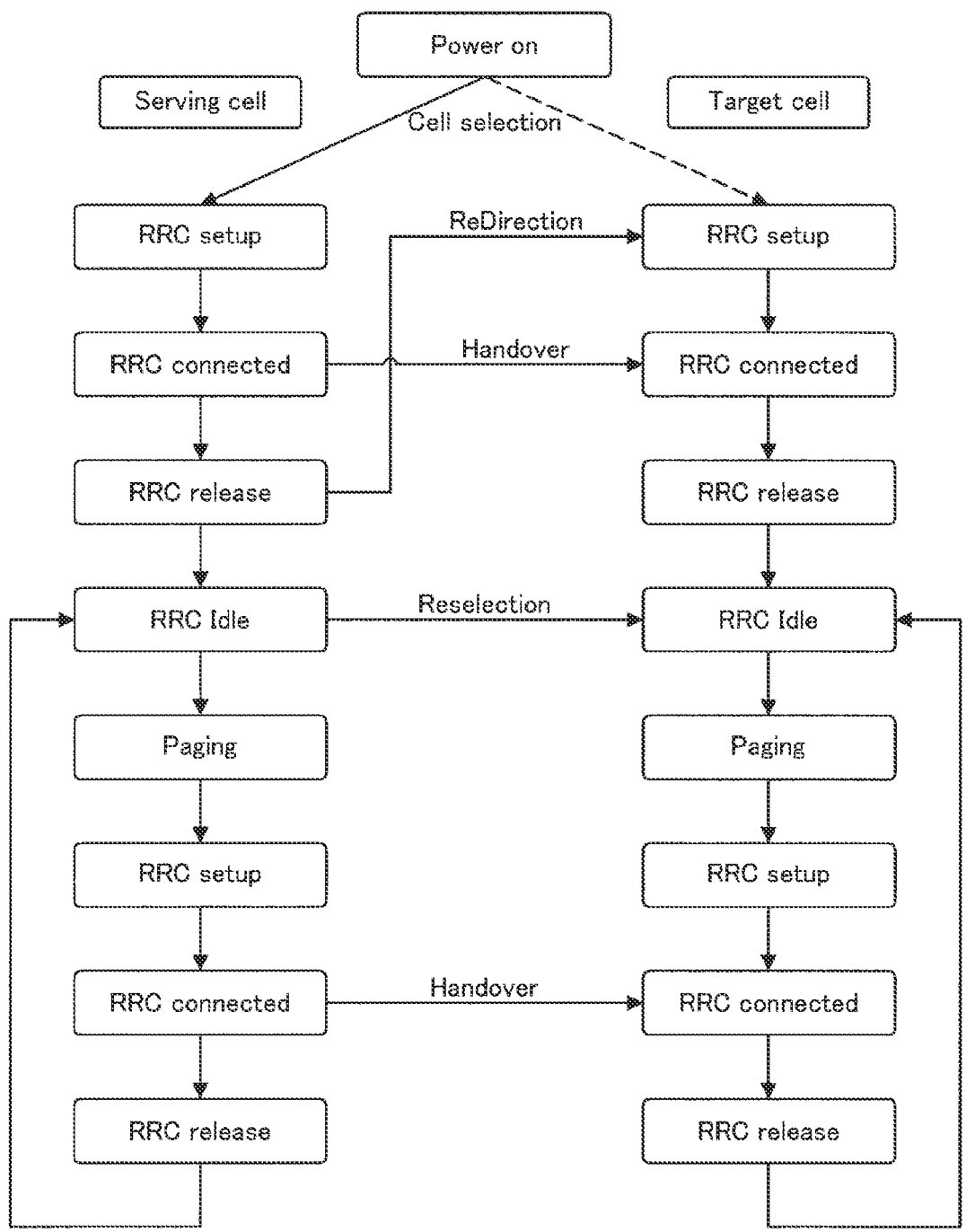
FIG. 15 is an explanatory diagram for describing an overview of handover and reselection in relay communication between base stations.

First, in order to make it easier to understand handover and reselection for mobile communication, an overview on handover and reselection in relay communication between base stations will be described with reference to FIG. 15 FIG. 15 is an explanatory diagram for describing an overview of handover and reselection in relay communication between base stations, showing an example of a state transition diagram of relay communication between the base stations.

As illustrated in FIG. 15, after an RRC setup is executed, a transition to an RRC connected state is performed in each of a serving cell and a target cell. The switch from the serving cell to the target cell in the RRC connected state corresponds to "handover." In addition, in a case in which the RRC connected state transitions to an RRC release state and a switch from the serving cell to the target cell is performed in the RRC release state, the switch corresponds to "redirection." In addition, in a case in which the RRC release state transitions to the RRC idle state and a switch from the serving cell to the target cell is performed in the RRC idle state, the switch corresponds to "reselection."

Figure 16:
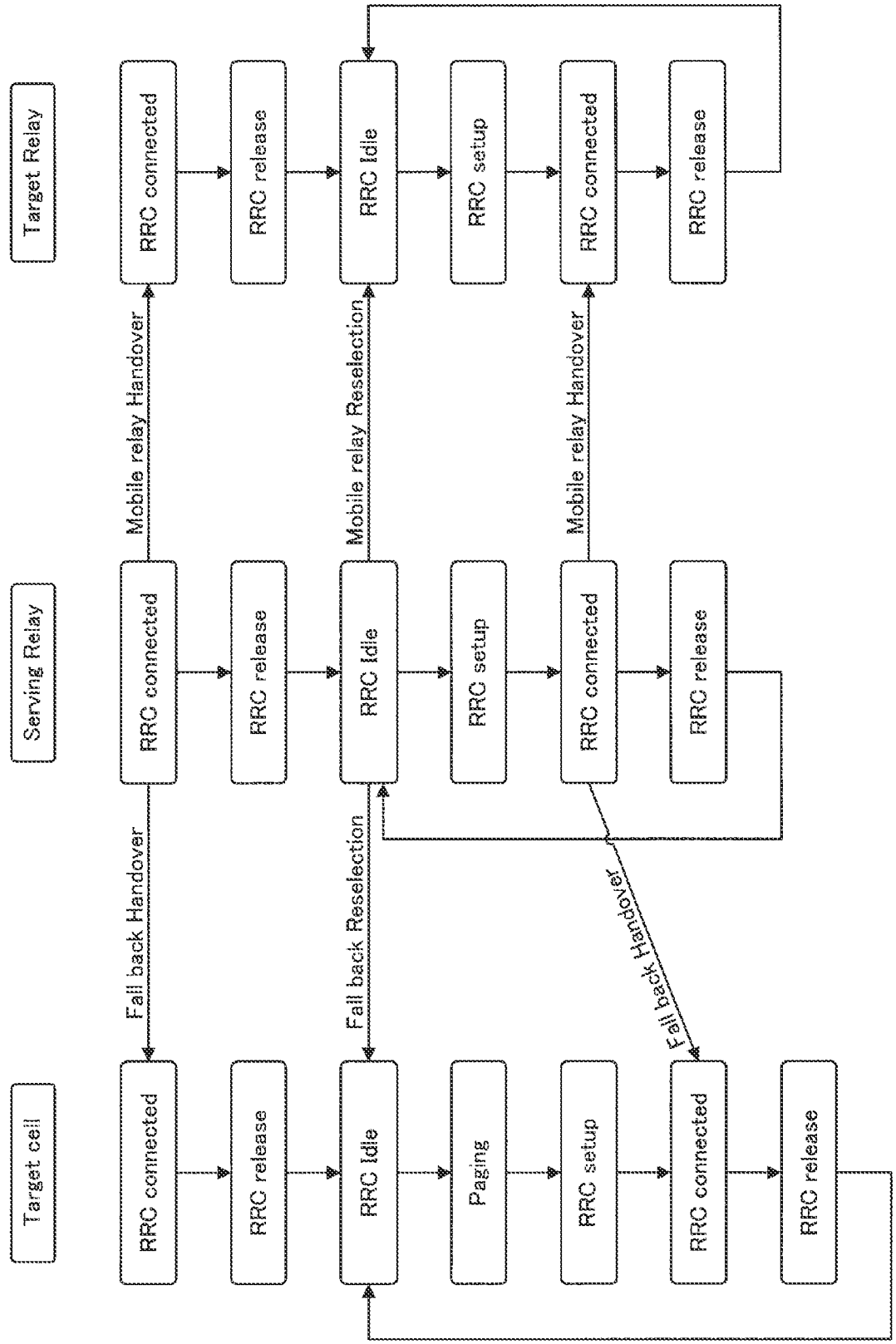
FIG. 16 is an explanatory diagram for describing an overview of handover and reselection in mobile relay communication according to an embodiment.

An overview on handover and reselection in mobile relay communication according to the present embodiment will be described on the basis of the above description with reference to FIG. 16. FIG. 16 is an explanatory diagram for describing an overview of handover and reselection in mobile relay communication according to the present embodiment, showing an example of a state transition diagram of mobile relay communication. Note that, in FIG. 16, a "serving relay (Serving Relay)" represents a relay terminal 100C actually transmitting and receiving data, and the serving relay is indicated as a relay terminal 100C that is a switch source in the example illustrated in FIG. 16. Note that the relay terminal 100C that is a switch source may also be referred to as a "source relay." In addition, a "target relay (Target Relay)" represents another relay terminal 100C (that is a switch destination in a switch between relay terminals 100C In addition, a "target cell" represents a cell that serves as a switch destination in a switch from relay communication via the relay terminal 100C to direct communication between the remote terminal 200C and the base station 100A.

Switches in mobile relay communication according to the present embodiment are classified into "mobile relay handover," "mobile relay reselection," "fallback handover," and "fallback reselection" as illustrated in FIG. 16.

Mobile relay handover corresponds to a process of switching the relay terminal 100C relaying communication between the remote terminal 200C and the base station 100A from the serving relay to another relay in the RRC connected state. In addition, mobile relay reselection corresponds to a process of switching the relay terminal 100C relaying communication between the remote terminal 200C and the base station 100A from the serving relay to another relay in the RRC idle state.

On the other hand, fallback handover corresponds to a process of switching communication between the remote terminal 200C and the base station 100A from relay communication via the relay terminal 100C to direct communication in the RRC connected state. In addition, fallback reselection corresponds to a process of switching communication between the remote terminal 200C and the base station 100A from relay communication via the relay terminal 100C to direct communication in the RRC idle state.

Note that each of "mobile relay handover," "mobile relay reselection," "fallback handover," and "fallback reselection" will be described in more detail below.

(2) Mobile Relay Handover

Figure 17:
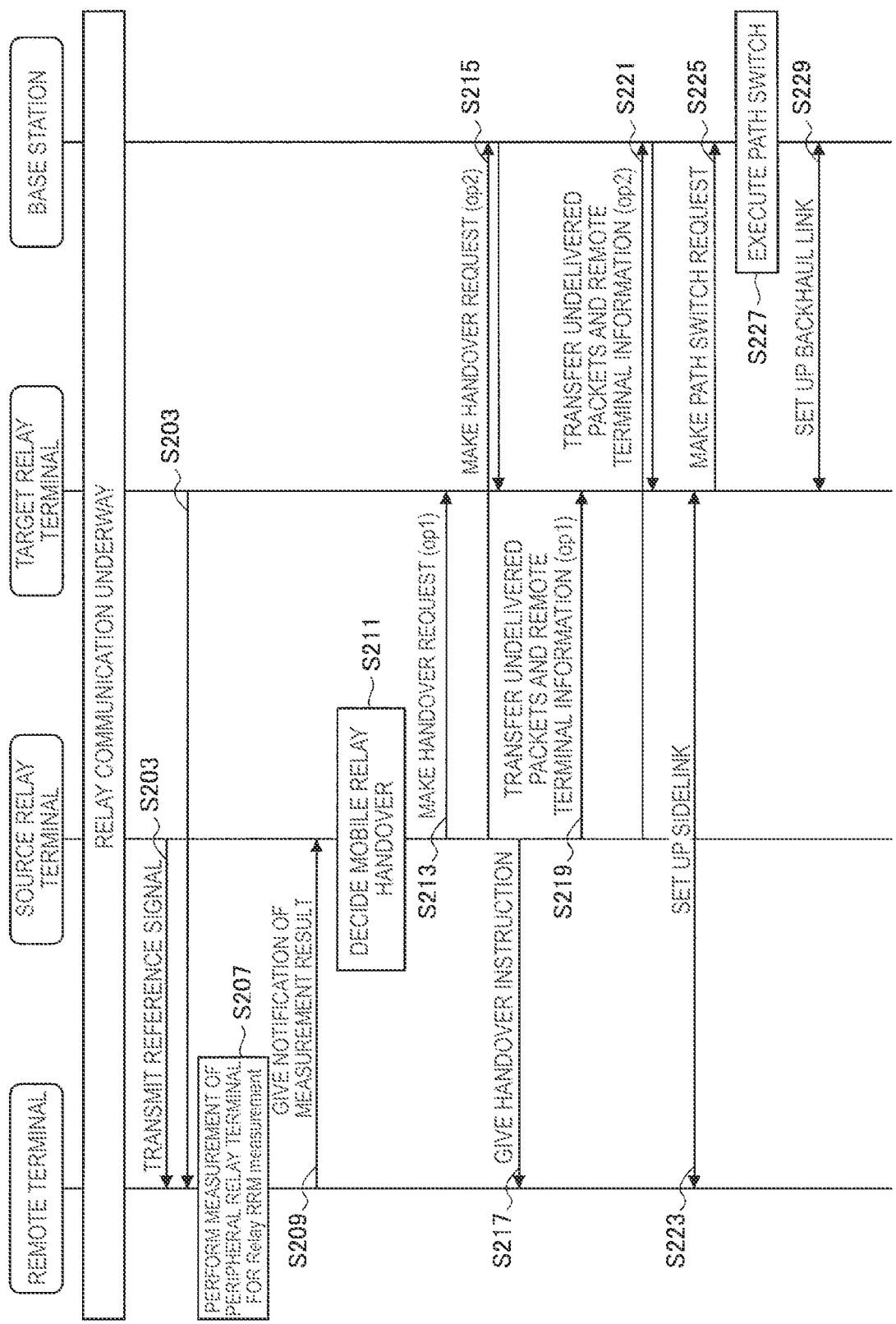
FIG. 17 is a sequence diagram illustrating an example of the flow of a series of processes of mobile relay handover.

First, mobile relay handover will be described. Mobile relay handover corresponds to handover between the relay terminals 100C. Note that subjects that make a handover decision include a relay terminal 100C (the determination unit 155), the remote terminal 200C (the determination unit 245), and the base station 100A (the determination unit 155). In addition, in thus case, measurement or estimation of the communication quality (e.g., RRM measurement) is performed in consideration of at least one of a sidelink or a backhaul link. In addition, information indicating the result of the measurement or estimation of the communication quality may be reported by a subject that performs the measurement or estimation to a subject that makes a handover decision. Thus, processes of individual cases in which a relay to terminal 100C, the remote terminal 200C, and the base station 100A make a handover decision respectively will be described in detail below (2-1) Case in which Relay Terminal Makes Handover Decision First, an example of the flow of a series of processes in a case in which a relay terminal 100 makes a handover decision will be described with reference to FIG. 17. FIG. 17 is a sequence diagram illustrating an example of the flow of a series of processes of mobile relay handover. Note that a relay terminal 100C that serves as a switch source will also be referred to as a "source relay terminal" and another relay terminal 100C that serves as a switch destination will also be referred to as a "target relay terminal" in the following description.

First, the remote terminal 200C performs measurement of the communication quality (Relay RRM measurement) in communication between the respective peripheral relay terminals 100C (S207) on the basis of a reference signal transmitted from each of the relay terminals 100C (S203) as illustrated in FIG. 17. Note that a setting for Relay RRM measurement may be directly made for the remote terminal 200C by the base station 100A via the downlink. In addition, as another example, a setting for Relay RRM measurement may be indirectly made for the remote terminal 200C by the base station 100A via the relay terminal 100C. At this time, the base station 100A or the relay terminal 100C instructs the remote terminal 200C to measure at least a part of a resource pool of which communication quality of the sidelink is to be measured.

in addition, the base station 100A or the relay terminal 100C may inform the remote terminal 200C of an event trigger for giving notification of the measurement result of the communication quality, for example, on the basis of RRC signaling. Note that, as event triggers for giving notification of the measurement result of the communication quality, for example, the following cases are exemplified.

Case in which the communication quality of the serving relay terminal has been improved to the extent of a threshold value or further Case in which the communication quality of the serving relay terminal has been degraded to the extent of the threshold value or further Case in which the communication quality of the peripheral relay terminal has been improved an offset amount more than in the serving relay Case in which the communication quality of the peripheral relay terminal has been improved to the extent of a threshold value or further Case in which the communication quality of the serving relay terminal has been degraded to the extent of a first threshold value or further and the communication quality of the peripheral relay terminal has been improved to the extent of a second threshold value or further Case in which the communication quality of a DMRS resource of the sidelink has been improved to the extent of a threshold value or further Case in which the communication quality of the DMRS resource of the sidelink has been improved an offset amount more than the communication quality of a DMRS resource of a reference The remote terminal 200C notifies the serving relay terminal (i.e., the source relay terminal) of information indicating the measurement result of the communication quality of the sidelink on the basis of the above-described event trigger (S209).

Upon receiving the notification of the information indicating the measurement result of the communication quality of the sidelink from the remote terminal 200C, the source relay terminal decides whether or not handover (i.e., mobile relay handover) is to be performed using the measurement result as reference information (Handover decision) (S211). At this time, in the case in which handover is decided to be performed, the source relay terminal notifies the target relay terminal serving as a switch destination of a handover request (S213 or S215), and notifies the remote terminal 200C of a handover instruction (S217).

Note that the handover instruction from the source relay terminal to the remote terminal 200C is notified through the existing sidelink (S217).

Meanwhile, the notification of the handover request from the source relay terminal to the target relay terminal is via either of direct notification via a sidelink between the relay terminals (S213) and indirect notification via the base station 100A (S215)

(Direct Notification Via Sidelink Between Relay Terminals)

As a specific example, first, the case in which the notification of the handover request is directly performed from the source relay terminal to the target relay terminal via a sidelink between the relay terminals will be described. In this case, the source relay terminal sets up a new sidelink with the target relay terminal and notifies the target relay terminal of the handover request via the sidelink.

More specifically, the source relay terminal transmits a discovery signal to the relay terminal 100C located in the vicinity to discover a target relay terminal. At this time, the source relay terminal may acquire identification information of the target relay terminal in advance in accordance with the measurement result of the communication quality from the remote terminal 200C and execute Mode 2 discovery (Mode 2 discovery) by using the identification information. Note that, as a reference, in Mode 1 discovery, a terminal device located in the vicinity is discovered by transmitting "I'm here" information. In addition, in Mode 2 discovery a terminal device located in the vicinity is discovered by transmitting "who is there?" or "are you there?" information.

When the target relay terminal is discovered, the source relay terminal sets up a sidelink with the target relay terminal. On the other hand, in a case in which the state in which it is not possible to discover the target relay terminal continues for a certain period of time, the source relay terminal may switch to indirect notification via the base station 100A. Note that the setting of a timer of this case may be set by the base station 100A for the relay terminal 100C (i.e., the source relay terminal) on the basis of RRC signaling, or may be pre-configured in the relay terminal 100C.

(Indirect Notification Via Base Station)

Next, the case in which the notification of the handover request is indirectly performed from the source relay terminal to the target terminal via the base station 100A will be described.

The source relay terminal notifies the base station 100A of information regarding the target relay terminal and information regarding the handover request via a Uu link. The base station 100A that has received the notification transfers information regarding the notified handover request to the target relay terminal corresponding to the notified information.

Upon receiving the transfer of the information regarding the handover request from the base station 100A, the target relay terminal discovers the source relay terminal by transmitting a Mode 1 or Mode 2 discovery signal to the terminal device located in the vicinity, and constructs a sidelink with the source relay terminal.

In addition, as another example, in a case in which the notification of the information regarding the handover request has been received from the source relay terminal, the base station 100A may set a resource pool for handover for each of the source relay terminal and the target relay terminal on the basis of RRC signaling. In addition, the base station 100A may set a resource pool for handover for each of the source relay terminal and the target relay terminal in advance. In addition, information regarding a resource pool for handover may be set in each of the relay terminals 100C in advance.

(Pre-Setup of Sidelink)

Note that the example of the case in which a sidelink is set up between the source relay terminal and the target relay terminal that serves as a switch destination in the case in which the source relay terminal decides handover has been described above. On the other hand, a sidelink between the source relay terminal and the target relay terminal may be performed in advance prior to the handover decision.

As a specific example, the source relay terminal may set up a sidelink with the relay terminal 100C located in the vicinity in advance, regardless of the handover decision.

In addition, as another example, the target relay terminal may discover the source relay terminal by transmitting a Mode 1 or Mode 2 discovery signal and set up a sidelink with the source relay terminal.

Note that information regarding a peripheral relay terminal may be provided, for example, from the base station to the relay terminal 100C, or from the remote terminal 200C to the relay terminal 100C.

Next, processes after the handover request will be described. When the handover request is made from the source relay terminal to the target relay terminal, the source relay terminal notifies the target relay terminal of information regarding undelivered packets and information regarding the remote terminal 200C (S219 or S221). At this time, the source relay terminal may use the sidelink with the target relay terminal to directly notify the target relay terminal of various kinds of information (S219). In addition, as another example, the source relay terminal may indirectly notify the target relay terminal of various kinds of information via the base station 100A (S221). In addition, in a case in which direct communication via the sidelink with the target relay terminal (S219) is difficult, the source relay terminal may switch to indirectly communication via the base station 100A (S221).

Next, the target relay terminal specifies the remote terminal 200C on the basis of the information notified from the source relay terminal and sets up a sidelink with the remote terminal 200C (S223). In addition, when notification of a series of information including information regarding the undelivered packets, the information regarding the remote terminal 200C, and the like to the target relay terminal is completed, the source relay terminal notifies the base station 100A of a path switch request (S225). Upon receiving this notification, the base station 100A switches the serving relay terminal of the remote terminal 200C from the source relay terminal to the target relay terminal (S227), and performs a switch (e.g., setup) of a backhaul link (S229). Accordingly, mobile link handover is completed.

The example of the flow of the series of processes in the case in which the relay terminal 100C makes a handover decision has been described above with reference to FIG. 17.

(2-2) Case in which Base Station Makes Handover Decision

Figure 18:
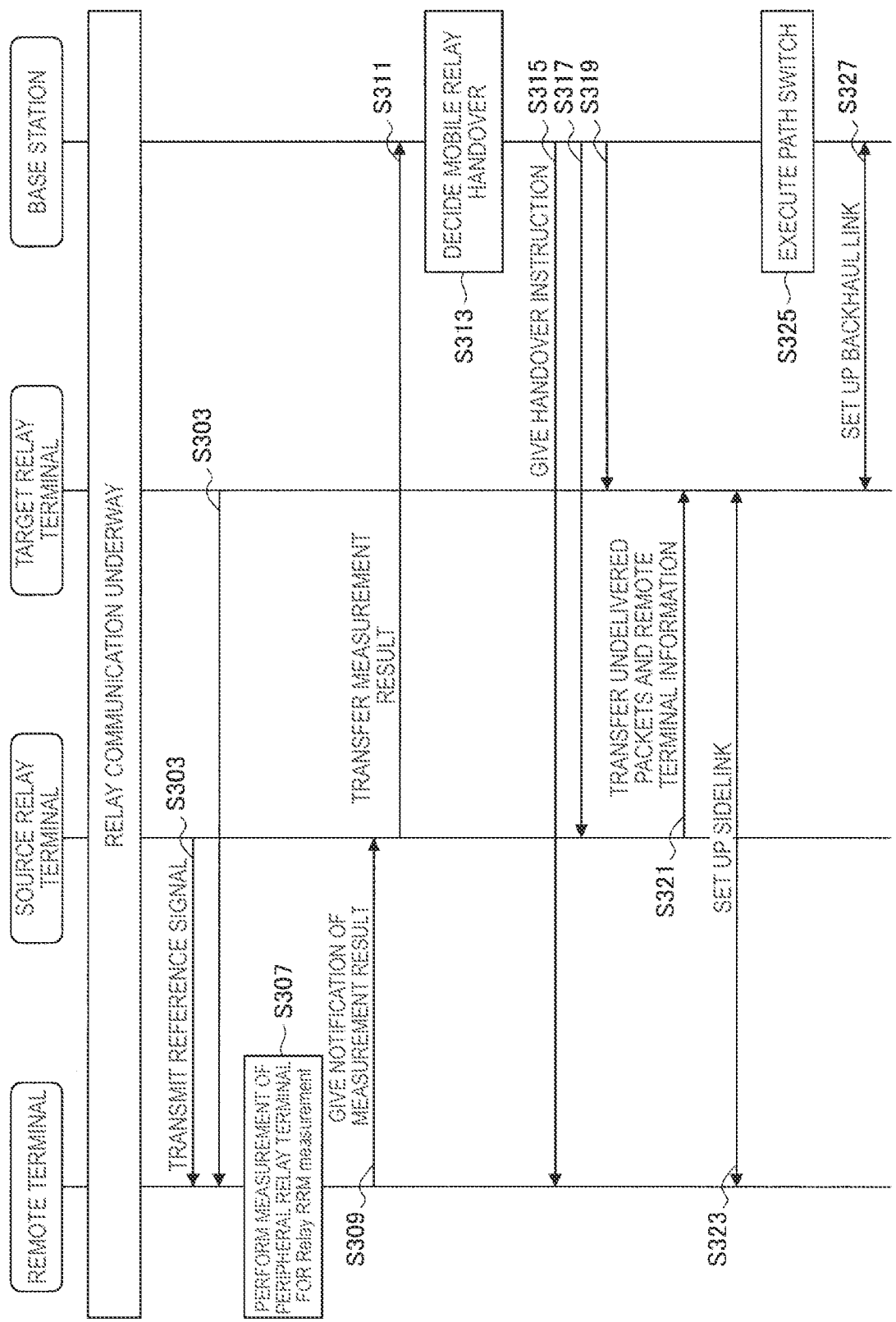
FIG. 18 is a sequence diagram illustrating another example of the flow of a series of processes of mobile relay handover.

Next, an example of the flow of a series of processes in a case in which the base station 100A makes a handover decision will be described with reference to FIG. 18. FIG. 18 is a sequence diagram illustrating another example of the flow of a series of processes of mobile relay handover.

First, the remote terminal 200C performs measurement of the communication quality (Relay RRM measurement) in communication with each of peripheral relay terminals 100C (S307) on the basis of reference signals transmitted from the relay terminals 100C (S303) as illustrated in FIG. 18. Note that, since the processes denoted by reference numerals S303 and S307 are similar to processes described as reference numerals S203 and S207 in the above-described example with reference to FIG. 17, respectively, detailed description thereof will be omitted.

Next, the remote terminal 200C notifies a relay terminal 100C such as the source relay terminal of information indicating the measurement result of the communication quality of the sidelink (S309). At this time, the relay terminal 100C transfers information indicating the measurement result of the communication quality of the sidelink notified from the remote terminal 200C to the base station 100A (S311).

Upon receiving the notification of the information indicating the measurement result of the communication quality of the sidelink transmitted from the remote terminal 200C via the relay terminal 100C, the base station 100A decides whether or not handover (i.e., mobile relay handover) is to be performed (Handover decision) using the measurement result as reference information (S313). At this time, in the case in which handover is decided to be performed, the base station 100A notifies the remote terminal 200C of a handover instruction (S315), and notifies each of the source relay terminal and the target relay terminal of a handover request (S317 and S319). Note that the handover instruction from the base station 100A to the remote terminal 200C may be directly notified via the Uu link, or indirectly notified via the serving relay terminal. In addition, a handover instruction from the source relay terminal to the remote terminal 200C may be notified via an existing sidelink.

When a handover request is made from the base station 100A to the source relay terminal and the target relay terminal, the source relay terminal notifies the target relay terminal of information regarding undelivered packets and information regarding the remote terminal 200C (S321). Note that the process is similar to that in the example described with reference to FIG. 17. That is, the source relay terminal may directly notify the target relay terminal of various kinds of information using the sidelink with the target relay terminal or indirectly notify the target relay terminal via the base station 100A.

Next, the target relay terminal specifies the remote terminal 200C on the basis of the information notified from the source relay terminal and sets up a sidelink with the remote terminal 200C (S323. In addition, the base station 100A switches the serving relay terminal of the remote terminal 200C from the source relay terminal to the target relay terminal (S325), and performs a switch (e.g., setup) of a backhaul link (S327). Accordingly, mobile link handover is completed.

The example of the flow of the series of processes in the case in which the base station 100A makes a handover decision has been described above with reference to FIG. 18.

(2-3) Case in which Remote Terminal Makes Handover Decision

Figure 19:
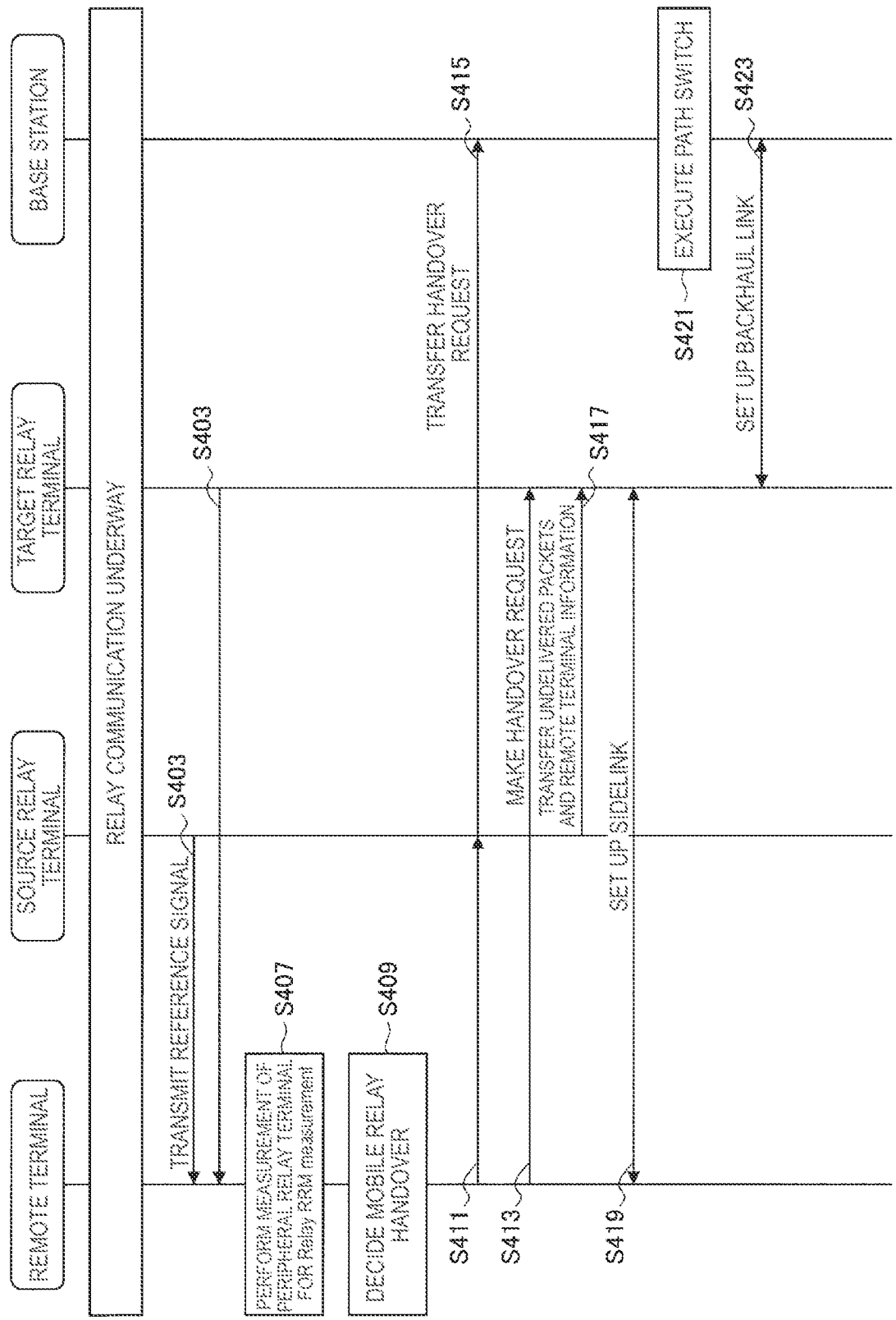
FIG. 19 is a sequence diagram illustrating another example of the flow of a series of processes of mobile relay handover.

Next, an example of the flow of a series of processes in a case in which the remote terminal 200C makes a handover decision will be described with reference to FIG. 19. FIG. 19 is a sequence diagram illustrating another example of the flow of a series of processes of mobile relay handover.

First, the remote terminal 200C performs measurement of the communication quality (Relay RRM measurement) in communication with each of peripheral relay terminals 100C (S407) on the basis of reference signals transmitted from the relay terminals 100C (S403) as illustrated in FIG. 19. Note that, since the processes denoted by reference numerals S403 and S407 are similar to processes described as reference numerals S203 and S207 in the above-described example with reference to FIG. 17, respectively, detailed description thereof will be omitted.

Next, the remote terminal 200C decides whether or not handover (i.e., mobile relay handover) is to be performed (Handover decision) using the measurement result of the communication quality in communication with each of the peripheral relay terminals 100C as reference information (S409). At this time, in the case in which handover is decided to be performed, the remote terminal 200C makes a handover request (or instruction) to each of the source relay terminal, the target relay terminal, and the base station 100A Note that the handover request from the remote terminal 200C to the source relay terminal is notified via the existing sidelink (S411). In addition, the handover request from the remote terminal 200C to the base station 100A may be directly notified via the Uu link or indirectly notified via the source relay terminal (S415). In addition, the notification of the handover request from the remote terminal 200C to the target relay terminal may be performed directly by setting up a sidelink with the target relay terminal or indirectly via the base station 100A (S413).

When the handover requests are made from the remote terminal 200C to the source relay terminal and the target relay terminal, the source relay terminal notifies the target relay terminal of information regarding undelivered packets and information regarding the remote terminal 200C (S417). Note that the process is similar to that in the example described with reference to FIG. 17. That is, the source relay terminal may directly notify the target relay terminal of various kinds of information using the sidelink with the target relay terminal or indirectly notify the target relay terminal via the base station 100A. In addition, at this time, the base station 100A may set a resource pool for handover for each of the source relay terminal and the target relay terminal on the basis of RRC signaling. In addition, the base station 100A may set a resource pool for handover for each of the source relay terminal and the target relay terminal in advance. In addition, information regarding a resource pool for handover may be pre-configured in each of the relay terminals 100C in advance.

Next, the target relay terminal sets up a sidelink with the remote terminal 200C (S419). In addition, the base station 100A switches the serving relay terminal of the remote terminal 200C from the source relay terminal to the target relay terminal (S421) on the basis of the handover request from the remote terminal 200C, and performs a switch (e.g., setup) of a backhaul link (S423). Accordingly, mobile link handover is completed.

The example of the flow of the series of processes in the case in which the remote terminal 200C makes a handover decision has been described above with reference to FIG. 19.

(3) Mobile Relay Reselection

Next, mobile relay reselection will be described Mobile relay reselection corresponds to reselection with the relay terminal 100C. In addition, subjects that make a reselection decision for mobile relay reselection include the relay terminal 100C (the determination unit 155), the remote terminal 200C (the determination unit 245), and the base station 100A (the determination unit 155). Note that, since the flow of a series of processes of mobile relay reselection is similar to that of mobile relay handover except that a transfer of information regarding undelivered packets and information regarding the remote terminal 200C (is unnecessary detailed description thereof will be omitted.

(4) Fallback Handover

Figure 20:
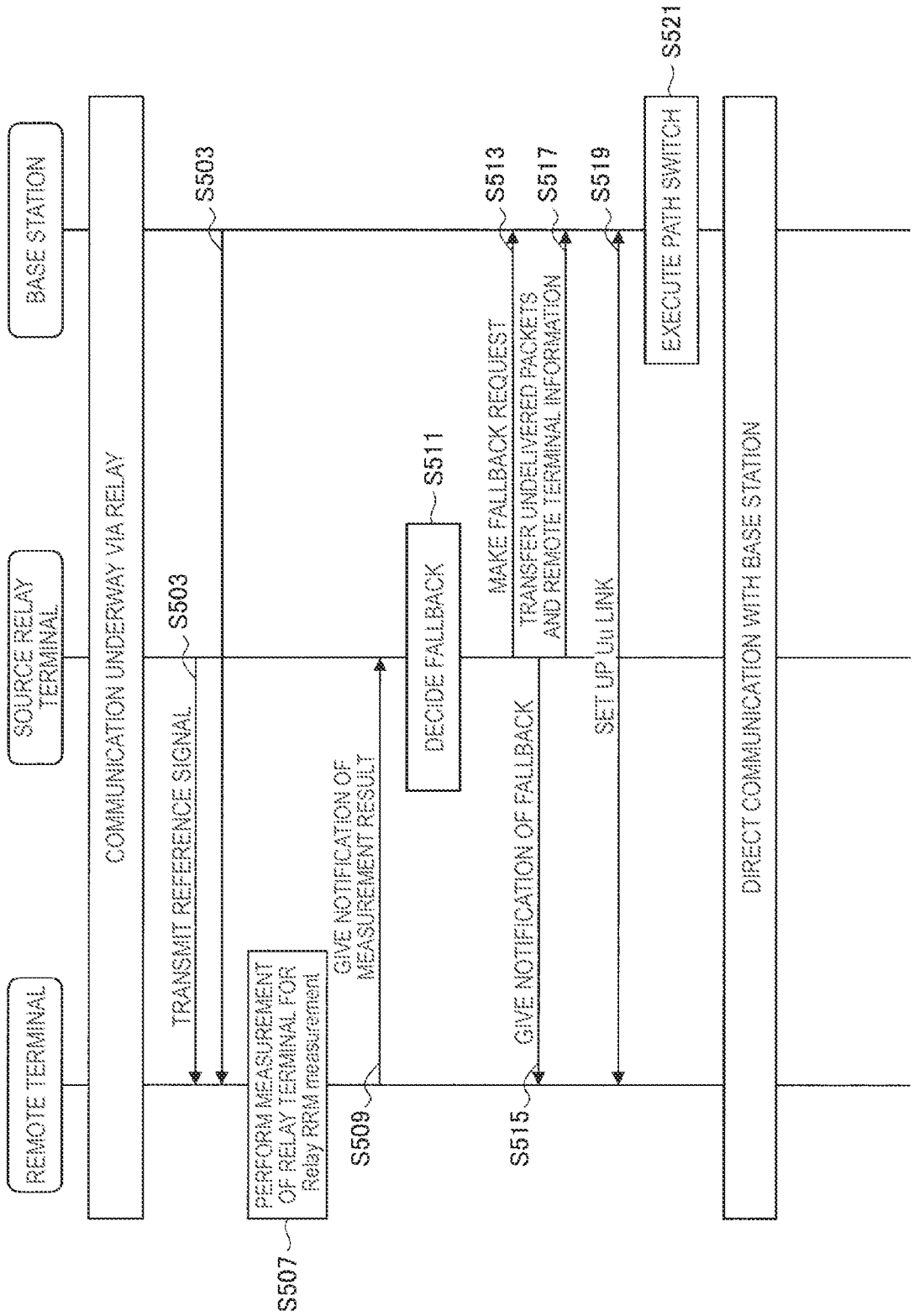
FIG. 20 is a sequence diagram illustrating an example of the flow of a series of processes of fallback handover.

Next, fallback handover will be described. As described above, fallback handover corresponds to a process of switching communication between the remote terminal 200C and the base station 100A from relay communication via the relay terminal 100C to direct communication. As an assumable situation, a situation in which the remote terminal 200C is performing communication only with the relay terminal 100C (serving relay terminal) and is not holding a direct radio link with the base station 100A (serving cell) is exemplified. Note that subjects that make a fallback decision include the relay terminal 100C (the determination unit 155), the remote terminal 200C (the determination unit 245), and the base station 100A (the determination unit 155). Thus, processes of individual cases in which the relay terminal 100C, the remote terminal 200C, and the base station 100 (A makes a fallback decision respectively will be described below in detail (4-1) Case in which Relay Terminal Makes Fallback Decision First, an example of the flow of a series of processes in a case in which the relay terminal 100C makes a fallback decision will be described with reference to FIG. 20. FIG. 20 is a sequence diagram illustrating an example of the flow of a series of processes of fallback handover.

The remote terminal 200C performs measurement of the communication quality (Relay RRM measurement) in communication with each of the peripheral relay terminal 100C (e.g., the source relay terminal) and the base station 100A (S507) on the basis of reference signals transmitted from each of the relay terminal 100C and the base station 100A (S503) as illustrated in FIG. 20. Note that, since a setting for Relay RRM measurement and an event trigger for notification of the measurement result of the communication quality are similar to those in the above-described case of mobile relay handover, detailed description thereof will be omitted. In addition, the remote terminal 200C notifies the serving relay terminal (i.e., the source relay terminal) of information indicating the measurement result of the communication quality of radio links with each of the relay terminal 100C and the base station 100A (i.e., a sidelink and a Uu link) on the basis of a predetermined event trigger (S509).

Upon receiving the notification of the information indicating the measurement result of the communication quality of the sidelink and Uu link from the remote terminal 200C, the source relay terminal decides whether or not fallback (i.e., fallback handover) is to be performed using the measurement result as reference information (S511). At this time, in the case in which performing fallback is decided, the source relay terminal notifies the base station 100A of a fallback request (S513), and notifies the remote terminal 200C that fallback is to be performed (S515).

When the fallback request is made from the source relay terminal to the base station 100A, the source relay terminal transfers information regarding undelivered packets and information regarding the remote terminal 200C to the base station 100A (S517).

Next, the base station 100A sets up a Uu link with the remote terminal 200C on the basis of the information notified from the source relay terminal (S519). Then, the base station 100A switches communication with the remote terminal 200C from mobile relay communication via the source relay terminal to direct communication (S521). Accordingly, fallback handover is completed.

The example of the flow of the series of processes in the case in which the relay terminal 100C makes a fallback decision has been described above with reference to FIG. 20.

(4-2) Case in which Base Station Makes Handover Decision

Figure 21:
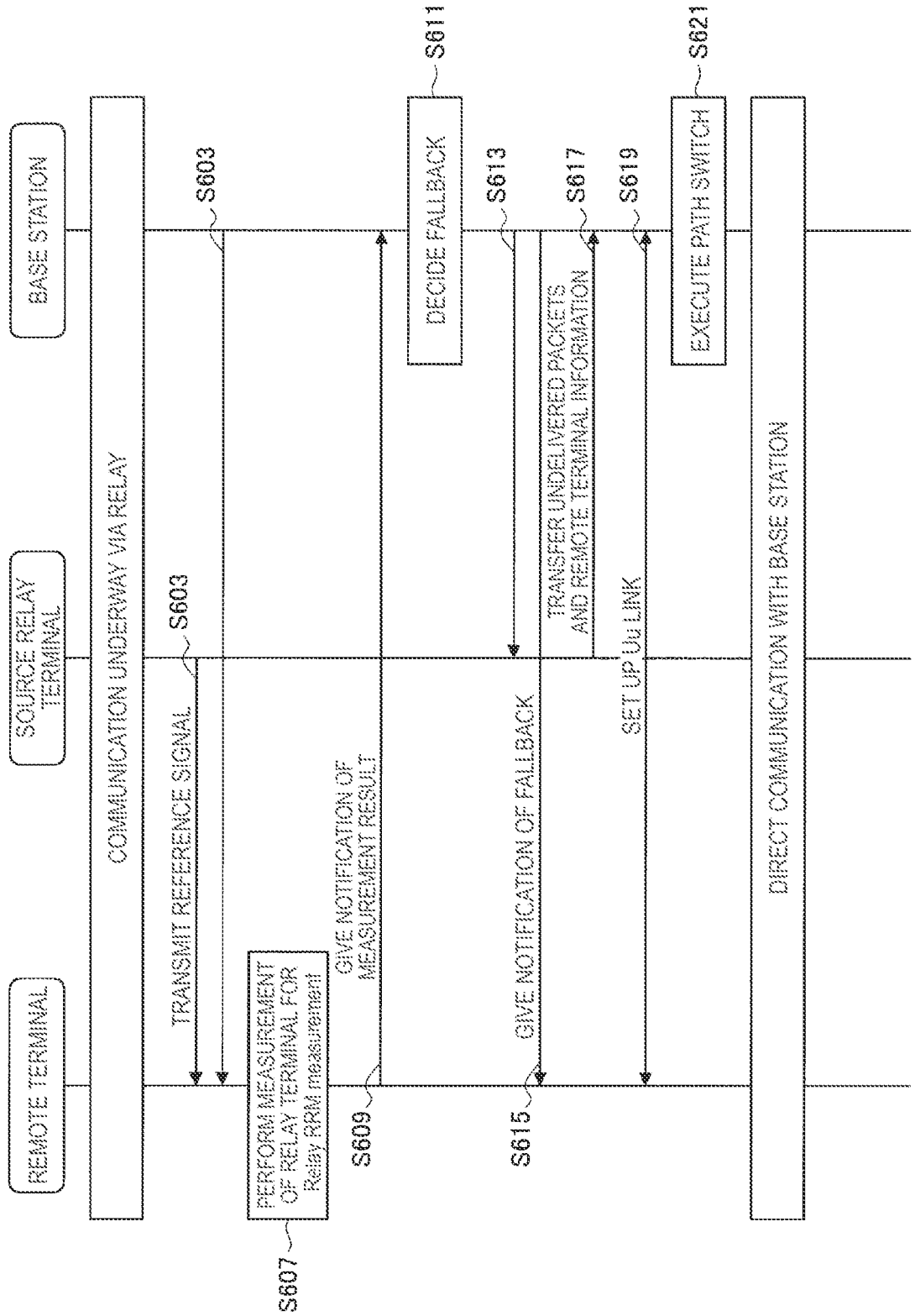
FIG. 21 is a sequence diagram illustrating another example of the flow of a series of processes of fallback handover.

Next, an example of the flow of a series of processes in a case in which the base station 100A makes a fallback decision will be described with reference to FIG. 21. FIG. 21 is a sequence diagram illustrating another example of the flow of a series of processes of fallback handover.

The remote terminal 200C performs measurement of the communication quality (Relay RRM measurement) in communication with each of the peripheral relay terminal 100C ((e.g., the source relay terminal) and the base station 100A (S607) on the basis of reference signals transmitted from the relay terminal 100C and the base station 100A (S603) as illustrated in FIG. 21. Note that, since the processes denoted by reference numerals S603 and S607 are similar to processes described as reference numerals S503 and S507 in the above-described example with reference to FIG. 20, respectively, detailed description thereof will be omitted.

Next, the remote terminal 200C notifies the base station 100A of information indicating the measurement result of the communication quality of the sidelink and the Uu link (S609). The base station 100A decides whether or not fallback (i.e., fallback handover) is to be performed using the information indicating the measurement result of the communication quality of the sidelink and Uu link transmitted from the remote terminal 200C as reference information (S611). At this time, in the case in which performing fallback is decided, the base station 100A notifies each of the source relay terminal and the remote terminal 200C that fallback is to be performed (S613 and S615).

Note that the following processes are similar to those in the above-described example with reference to FIG. 20. That is, the source relay terminal transfers information regarding undelivered packets and information regarding the remote terminal 200C to the base station 100A (S617). In addition, the base station 100A sets up a Uu link with the remote terminal 200C (S619), and switches communication with the remote terminal 200C from mobile relay communication via the source relay terminal to direct communication (S621). Accordingly, fallback handover is completed.

The example of the flow of the series of processes in the case in which the base station 100A makes a fallback decision has been described above with reference to FIG. 21.

(4-3) Case in which Remote Terminal Makes Handover Decision

Figure 22:
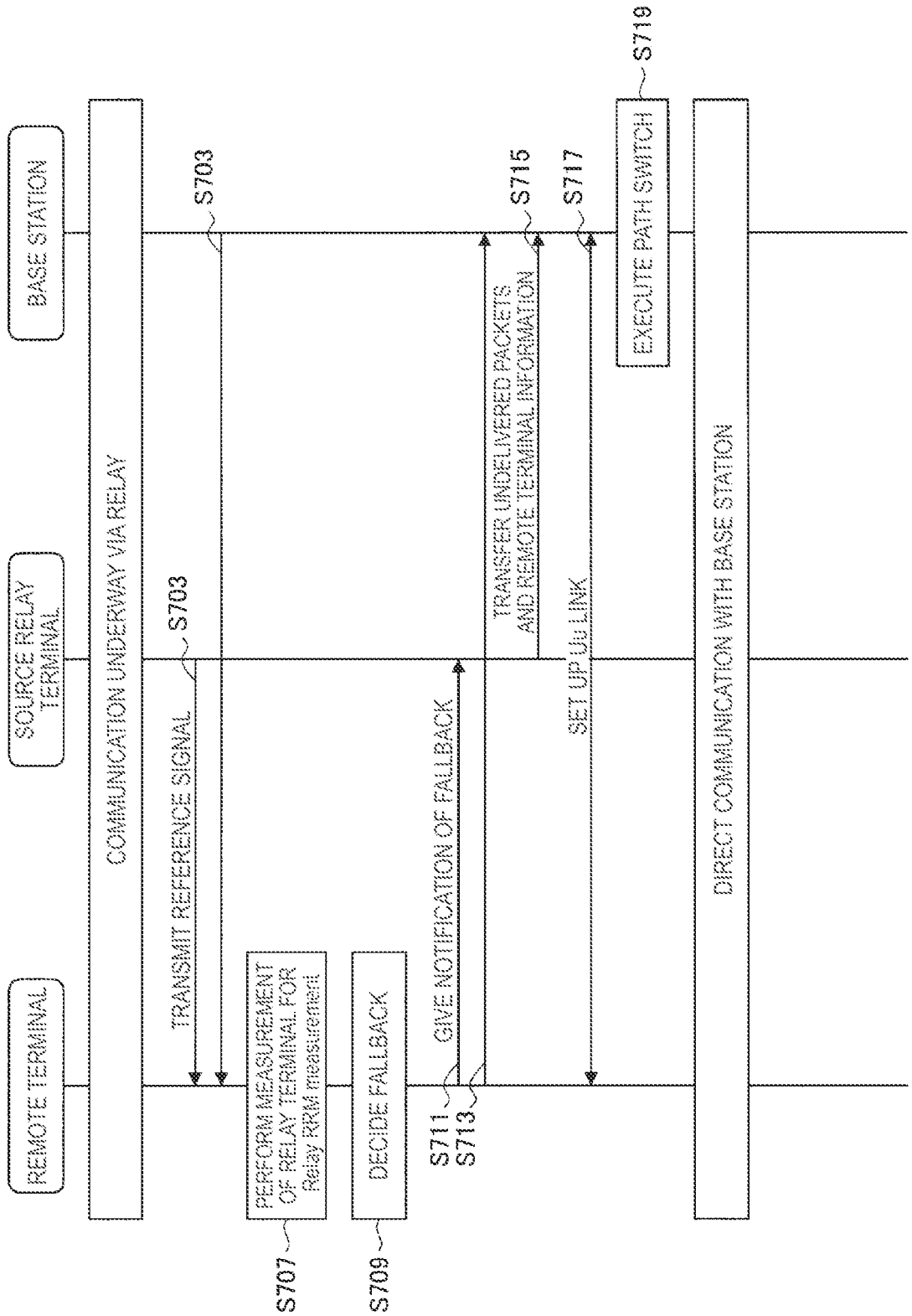
FIG. 22 is a sequence diagram illustrating another example of the flow of a series of processes of fallback handover.

Next, an example of the flow of a series of processes in a case in which the remote terminal 200C makes a fallback decision will be described with reference to FIG. 22. FIG. 22 is a sequence diagram illustrating another example of the flow of a series of processes of fallback handover.

The remote terminal 200C performs measurement of the communication quality (Relay RRM measurement) in communication with each of the peripheral relay terminal 100C (e.g., the source relay terminal) and the base station 100A (S707) on the basis of reference signals transmitted from the relay terminal 100C and the base station 100A (S703) as illustrated in FIG. 22. Note that, since the processes denoted by reference numerals S703 and S707 are similar to processes described as reference numerals S503 and S507 in the above-described example with reference to FIG. 20, respectively detailed description thereof will be omitted.

Next, the remote terminal 200C decides whether or not fallback (i.e., fallback handover) is to be performed using the measurement result of the communication quality of communication with each of the relay terminal 100C and the base station 100A as reference information (S709). At this time, in the case in which performing fallback is decided, the remote terminal 200C makes a fallback request to each of the source relay terminal and the base station 100A (S711 and S713).

Note that the following processes are similar to those in the above-described example with reference to FIG. 20. That is, the source relay terminal transfers information regarding undelivered packets and information regarding the remote terminal 200C to the base station 100A (S715). In addition, the base station 100A sets up a Uu link with the remote terminal 200C (S717), and switches communication with the remote terminal 200C from mobile relay communication via the source relay terminal to direct communication (S719). Accordingly, fallback handover is completed.

The example of the flow of the series of processes in the case in which the remote terminal 200C makes a fallback decision has been described above with reference to FIG. 22.

(5) Fallback Reselection

Next, fallback reselection will be described. Fallback reselection corresponds to reselection from mobile relay communication between the remote terminal 200C and the base station 100A via the relay terminal 100C to direct communication between the remote terminal 200C and the base station 100A. Subjects that decide fallback reselection include the relay terminal 100C (the determination unit 155), the remote terminal 200C (the determination unit 245), and the base station 100A (the determination unit 155). Note that, since the flow of a series of processes for fallback reselection is similar to fallback handover except that a transfer of information regarding undelivered packets and information regarding the remote terminal 200C is unnecessary, detailed description thereof will be omitted. In addition, after fallback, the remote terminal 200C executes random access to the base station 100C via RACH and transitions from an idle mode to a connected mode.

4. APPLICATION EXAMPLES

The technology according to the present disclosure can be applied to various products. For example, the base station 100 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station 100 may be realized as another type of base station such as a NodeB or a base transceiver station (BTS). The base station 100 may include a main entity (also referred to as a base station device) that controls wireless communication and one or more remote radio heads (RRHs) disposed at different locations from the main entity. Further, various types of terminals to be described below may operate as the base station 100 by performing a base station function temporarily or permanently. Moreover, at least some of the constituent elements of the base station 100 may be realized in a base station device or a module for the base station device.

Further, for example, the terminal device 200 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 200 may be realized as a terminal that performs machine to machine (M2M) communication (also referred to as a machine type communication (MTC) terminal). Further, the terminal device 200 may be realized as so-called low cost terminal, such as an MTC terminal, an eMTC terminal, an NB-IoT terminal. Moreover, at least some of the constituent elements of the terminal device 200 may be realized in a module mounted on the terminal (for example, an integrated circuit module configured on one die).

<4.1. Application Examples for Base Station>

First Application Example

Figure 23:
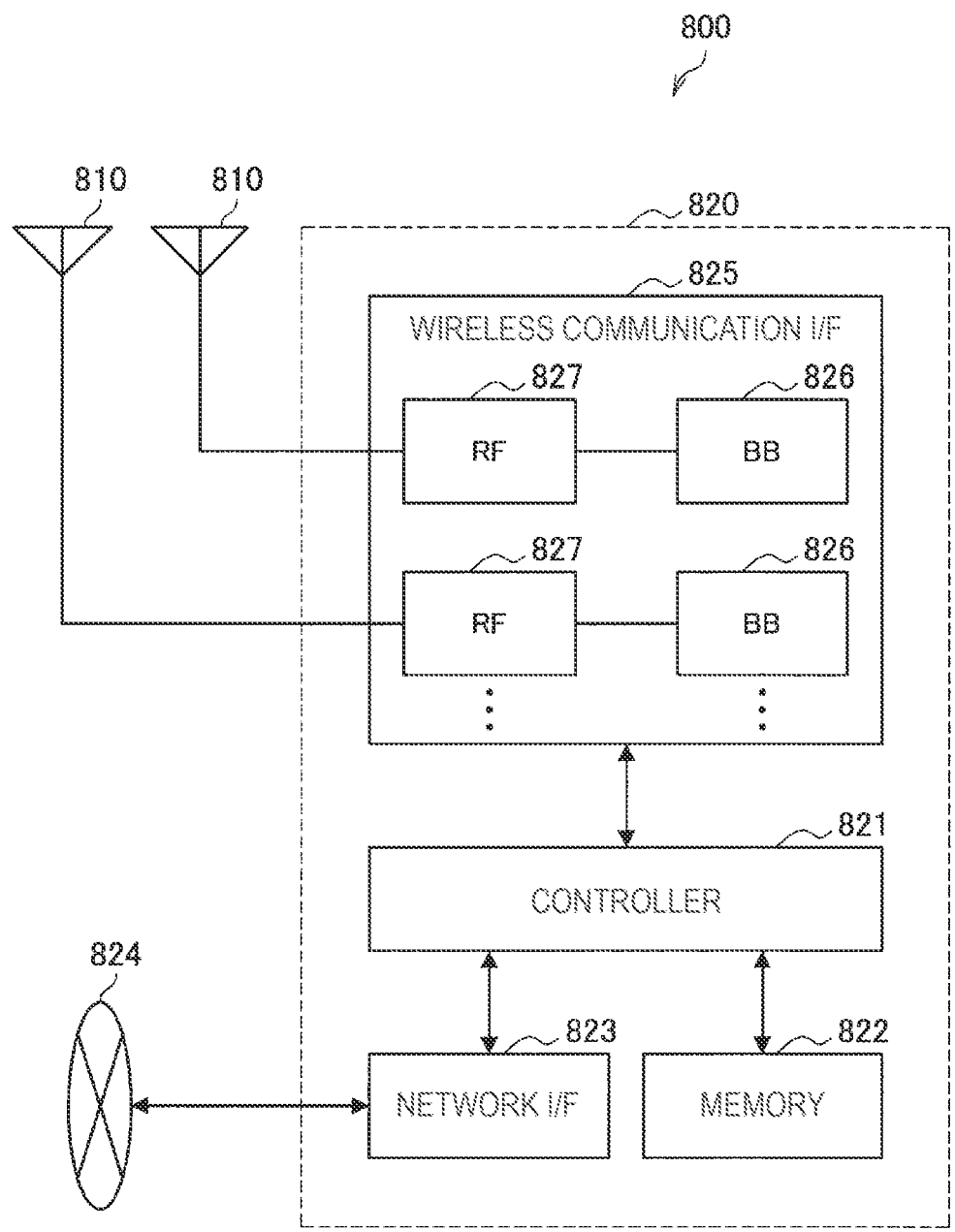
FIG. 23 is a block diagram illustrating a first example of a schematic configuration of an eNB.

FIG. 23 is a block diagram Illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 23, and the plurality of antennas 810 may, for example, correspond to a plurality of frequency bands used by the eNB 800. It should be noted that while FIG. 23 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul link. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced. and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further the module may be a card or blade to be inserted into a slot of the base station apparatus 820, or a chip mounted on the card or the blade. Meanwhile, the RF circuit 827 may include a mixer a filter, an amplifier, and the like, and transmits and receives a wireless signal via the antenna 810.

The wireless communication interface 825 may include a plurality of the BB processors 826 as illustrated in FIG. 23, and the plurality of BB processors 826 may, for example, correspond to a plurality of frequency bands used by the eNB 800. Further, the wireless communication interface 825 may also include a plurality of the RF circuits 827, as illustrated in FIG. 23, and the plurality of RF circuits 827 may, for example, correspond to a plurality of antenna elements. Note that FIG. 23 to illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 23, one or more constituent elements (at least any one of the communication processing unit 151, the information acquisition unit 153, the determination unit 155, or the notification unit 157) described with reference to FIG. 4 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 23, the wireless communication unit 120 described with reference to FIG. 4 may be implemented in the wireless communication interface 825 (for example, the RF circuit 827). Further, the antenna unit 110 may be implemented in the antenna 810. Further, the network communication unit 130 may be implemented in the controller 821 and/or the to network interface 823. In addition, the storage unit 140 may be implemented in the memory 822.

Second Application Example

Figure 24:
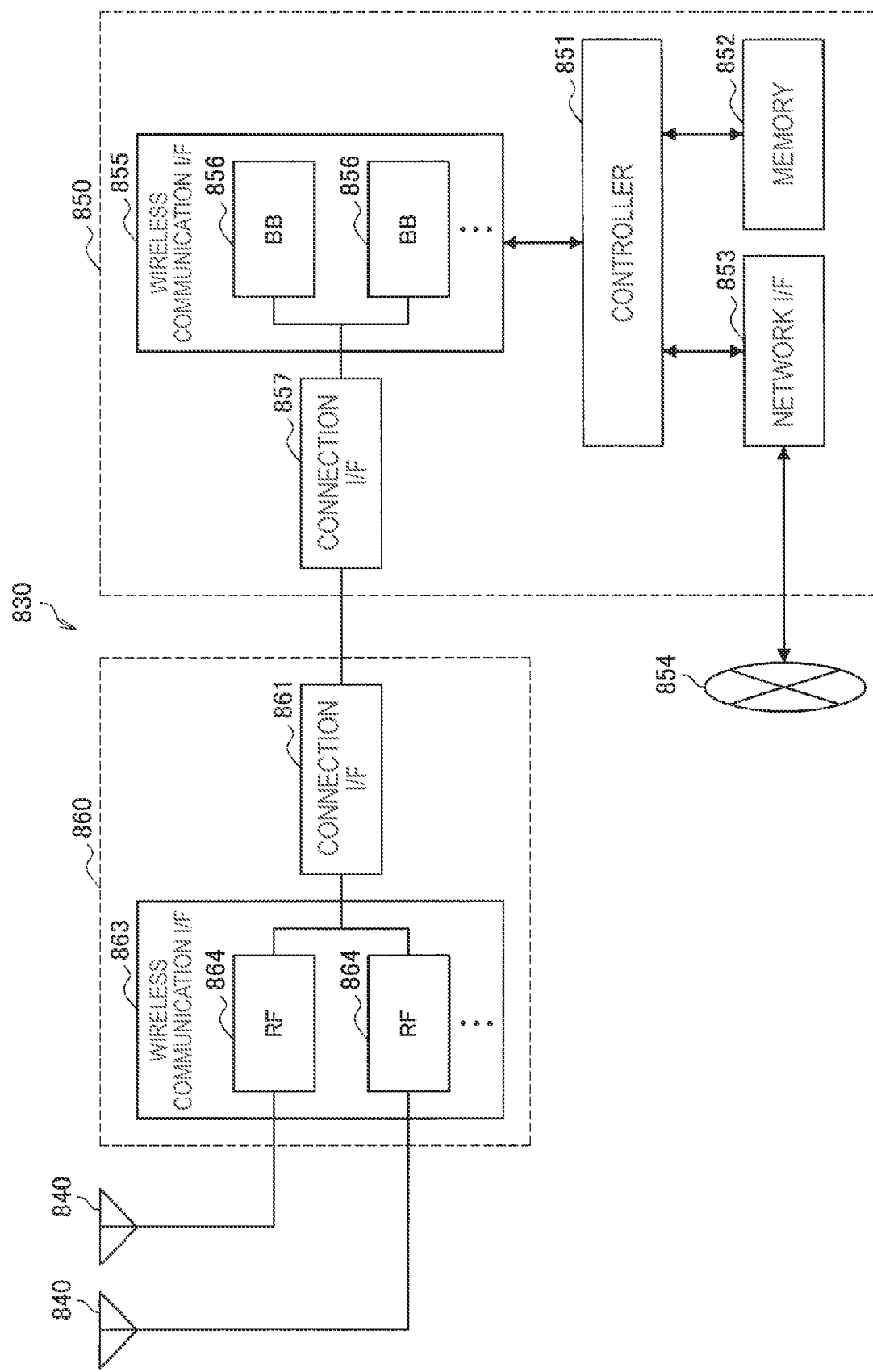
FIG. 24 is a block diagram illustrating a second example of the schematic configuration of the eNB.

FIG. 24 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 24, and the plurality of antennas 840 may, for example, correspond to a plurality of frequency bands used by the eNB 830. Note that FIG. 24 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 23.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 23 except that the BB processor 856 is connected to an RF circuit 864 of the RRH 860 via the connection interface 857. The wireless communication interface 855 may include a plurality of the BB processors 856, as illustrated in FIG. 23, and the plurality of BB processors 856 may, for example, correspond to a plurality of frequency bands used by the eNB 830. Note that FIG. 24 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interlace 861 and a wireless communication inter face 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 24, and the plurality of RF circuits 864 may, for example, correspond to a plurality of antenna elements. Note that FIG. 24 illustrates an example in which the wireless communication interface 863 includes the plurality of RF circuits 864, but the wireless communication interface 863 may include the single RF circuit 864.

In the eNB 830 illustrated in FIG. 24, one or more constituent elements (at least any one of the communication processing unit 151, the information acquisition unit 153, the determination unit 155, or the notification unit 157) included in the processing unit 150 described with reference to FIG. 4 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 855 and/or the controller 851 may be implemented on the eNB 830. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 13, for example, the wireless communication unit 120 described with reference to FIG. 4 may be implemented in the wireless communication interface 863 (for example, the RF circuit 864). Further, the antenna unit 110 may be implemented in the antenna 840. Further, the network communication unit 130 may be implemented in the controller 851 and/or the network interface 853. In addition, the storage unit 140 may be implemented in the memory 852.

<4.2. Application Examples for Terminal Device>

First Application Example

Figure 25:
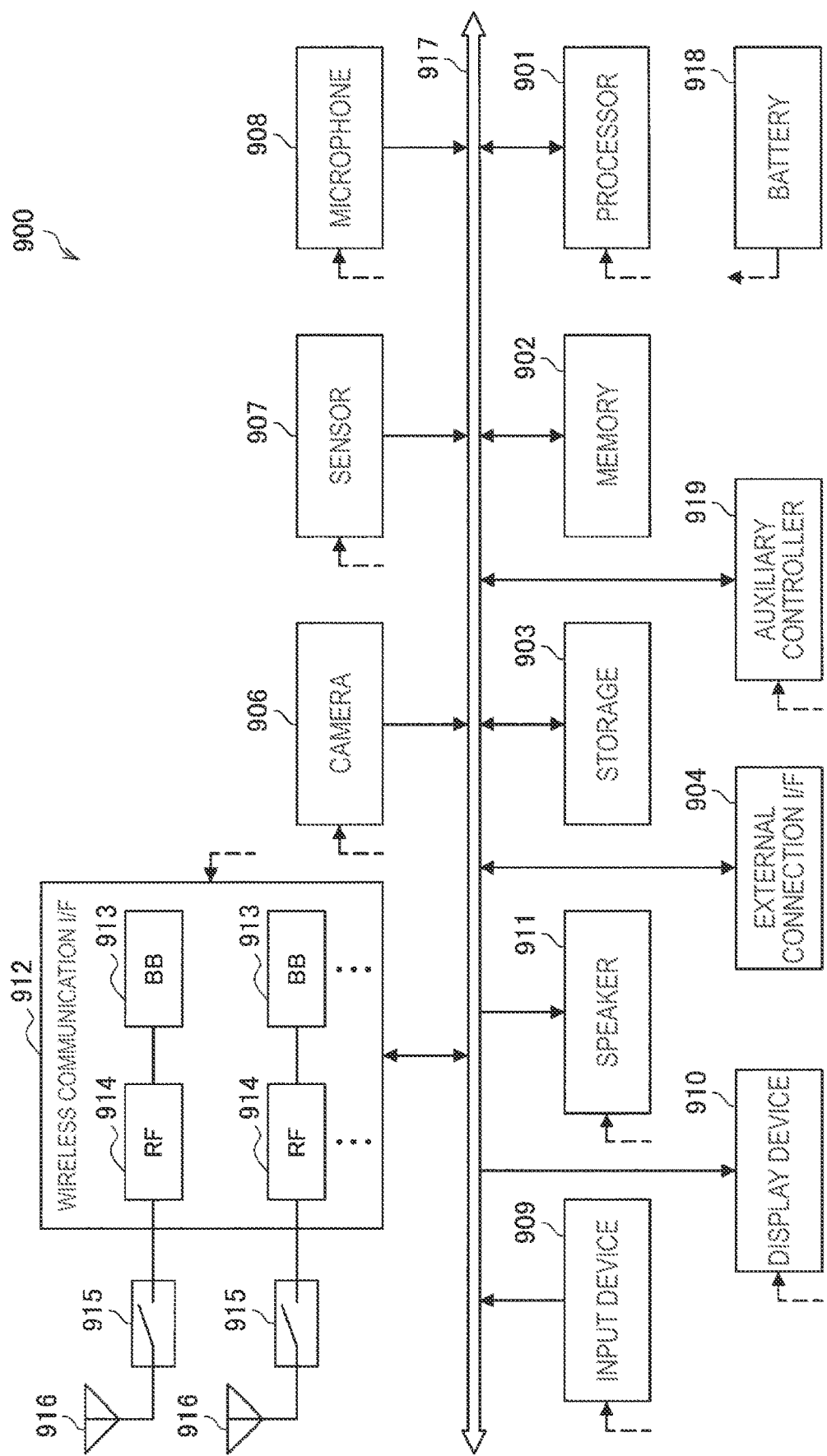
FIG. 25 is a block diagram illustrating an example of a schematic configuration of a smartphone.

FIG. 25 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 901) to an audio signal. The input device 909 includes, for example, a touch sensor which detects that a screen of the display device 910) is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LE-Advanced. and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 25. Note that FIG. 25 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 25. Note that FIG. 25 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 25 via a feeder line that is partially illustrated in the figure as a dashed line. The auxiliary controller 919, for example, operates a minimally necessary function of the smartphone 900 in a sleep mode.

In the smartphone 900 illustrated in FIG. 25, one or more constituent elements (at least any one of the communication processing unit 241, the information acquisition unit 243, the determination unit 245, or the notification unit 247) included in the processing unit 240 described with reference to FIG. 5 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be implemented on the smartphone 900. The one or more constituent elements may be implemented in the module. In this case, the module may store a program causing a processor to function as the one more constituent elements (in other words, a program causing the processor to execute operations of the one or more constituent elements, and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 25, for example, the wireless communication unit 220 described with reference to FIG. 5 may be implemented in the wireless communication interface 912 (for example, the RF circuit 914). Further, the antenna 210 may be implemented in the antenna 916. In addition, the storage unit 230 may be implemented in the memory 902.

Second Application Example

FIG. 26 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 26. Note that FIG. 26 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 26. Note that FIG. 26 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 26 via a feeder line that is partially illustrated in the figure as a dashed line. Further, the battery 938 accumulates the electric power supplied from the vehicle.

In the car navigation 920 illustrated in FIG. 26, one or more constituent elements (at least any one of the communication processing unit 241, the information acquisition unit 243, the determination unit 245, or the notification unit 247) included in the processing unit 240 described with reference to FIG. 5 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be implemented on the car navigation 920. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the car navigation 920, and the wireless communication interface 933 (for example, the BB processor 934) and/or the processor 921 may execute the program. In thus way, the car navigation 920 or the module may be provided as a device including the one or more constituent elements and a program causing the processor to function as the one or more constituent elements may be provided. In addition, a readable recording medium on which the program is recorded may be provided.

Further, in the car navigation 920 illustrated in FIG. 26, for example, the wireless communication unit 220 described with reference to FIG. 5 may be implemented in the wireless communication interface 933 (for example, the RF circuit 935). Further, the antenna 210 may be implemented in the antenna 937. In addition, the storage unit 230 may be implemented in the memory 922.

The technology of the present disclosure may also be realized as an in-vehicle system (or a vehicle) 940 including one or more blocks of the car navigation apparatus 920, the in-vehicle network 941, and a vehicle module 942. That is, the in-vehicle system (or a vehicle) 940 may be provided as a device that includes at least one of the communication unit 241, the information acquisition unit 243, or the notification unit 245. The vehicle module 942 generates vehicle data such as vehicle speed, engine speed, and trouble information, and outputs the generated data to the in-vehicle network 941.

5. CONCLUSION

A communication device according to the present embodiment acquires information regarding the communication quality of one or more radio links including at least one of a first direct radio link between a remote terminal and a base station or a second radio link via a movable relay terminal as described above. In addition, the communication device switches the radio link to be used between the remote terminal and the base station on the basis of the acquired information regarding the communication quality.

With this configuration, the communication device according to the present embodiment can realize handover, reselection, and fallback of mobile relay communication using a relay terminal in a more satisfactory manner. That is, since the communication device according to the present embodiment can stably continue communication even in an unstable situation in which it is difficult for the relay terminal to function or the like, service continuity can be secured and QoS can be guaranteed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative That is, with or in the place of the above effects, the technology according to the present disclosure may achieve other effects that are clear to those skilled in the art from the description of this specification.

Additionally, the present technology may also be configured as below.

(1)

A communication device including.

a communication unit configured to perform wireless communication; and a control unit configured to acquire information regarding a communication quality of one or more radio links including at least one of a direct first radio link or a second radio link via a relay terminal, which is configured to be movable, between a remote terminal and a base station, and to switch the radio link to be used in communication between the remote terminal and the base station on the basis of the acquired information regarding the communication quality.

(2)

The communication device according to (1), in which, of the information regarding the communication quality of the second radio link, information regarding the communication quality of a third radio link between the remote terminal and the relay terminal is acquired in accordance with an estimation result of the communication quality based on a first threshold value for evaluating whether or not the communication quality reaches a predetermined level, a second threshold value for evaluating whether or not the communication quality no longer reaches a predetermined level, and a measurement result regarding the communication quality of the third radio link.

(3)

The communication device according to (2), in which at least one of the first threshold value or the second threshold value is set by the base station or the relay terminal.

(4)

The communication device according to (2) or (3), in which a resource for measurement of the communication quality is set by the base station or the relay terminal.

(5)

The communication device according to any one of (2) to (4), in which the communication device is one communication terminal of the remote terminal and the relay terminal, and the control unit acquires the information regarding the communication quality of the third radio link from the other communication terminal different from the one communication terminal.

(6)

The communication device according to any one of (2) to (4), in which the communication device is one communication terminal of the remote terminal and the relay terminal, and the control unit measures the communication quality of the third radio link and acquires the information regarding the communication quality of the third radio link in accordance with the estimation result based on the measurement result, the first threshold value, and the second threshold value.

(7)

The communication device according to (6), in which the control unit intermittently measures a communication quality of a resource pool associated with the third radio link in time series and acquires the information regarding the communication quality of the third radio link on the basis of the measurement result.

(8)

The communication device according to (7), in which the control unit measures a communication quality of each of a plurality of the resource pools associated with the third radio link in time series.

(9)

The communication device according to any one of (2) to (4).

in which the communication device is the base station, and the control unit acquires the information regarding the communication quality of the third radio link from the remote terminal or the relay terminal.

(10)

The communication device according to any one of (1) to (9), in which, of the information regarding the communication quality of the second radio link, information regarding the communication quality of a fourth radio link between the relay terminal and the base station is acquired on the basis of a measurement result regarding the communication quality of the fourth radio link.

(11)

The communication device according to (10), in which the communication device is the remote terminal, and the control unit acquires the information regarding the communication quality of the fourth radio link by determining the communication quality of the fourth radio link on the basis of a second criterion that is different from a first criterion for the communication quality of the first radio link.

(12)

The communication device according to (11), in which the second criterion is set such that degradation or improvement of the communication quality of the fourth radio link is determined on the basis of a smaller change in the communication quality than in a case in which the communication quality of the first radio link is determined.

(13)

The communication device according to (11) or (12), in which the second criterion is set by the base station.

(14)

The communication device according to (11) or (12), in which the control unit calculates the second criterion on the basis of the first criterion.

(15)

The communication device according to (10).

in which the communication device is the relay terminal or the base station, and the control unit acquires the information regarding the communication quality of the fourth radio link by measuring the communication quality of the fourth to radio link.

(16)

The communication device according to (10), in which the communication device is one communication terminal of the remote terminal and the relay terminal, and the control unit acquires the information regarding the communication quality of the fourth radio link from the other communication terminal that is different from the one communication terminal.

(17)

The communication device according to any one of (1) to (16).

in which the communication device is the relay terminal, and the control unit performs control such that, in a case in which the radio link to be used in communication between the remote terminal and the base station is switched from the second radio link via a first relay terminal to the second radio link via a second relay terminal that is different from the first relay terminal, the second relay terminal is notified of a request for the switch directly or indirectly via the base station.

(18)

The communication device according to (17).

in which the control unit performs control such that the second relay terminal is directly notified of the request for the switch in a case in which the second relay terminal is discovered on the basis of a search result for another relay terminal located in a vicinity, and performs control such that the second relay terminal is indirectly notified of the request for the switch via the base station in a case in which the second relay terminal is not discovered.

(19)

A communication device including:

a communication unit configured to perform wireless communication; and a notification unit configured to acquire information regarding a communication quality of at least one of a direct first radio link or a second radio link via a relay terminal, which is configured to be movable, between a remote terminal and a base station, and to directly or indirectly notify an external device that switches the radio link to be used in communication between the remote terminal and the base station of the acquired information regarding the communication quality.

(20)

The communication device according to (19).

in which the communication device is the relay terminal, and the notification unit notifies the remote terminal of the acquired information regarding the communication quality directly or indirectly via the base station.

(21)

The communication device according to (19), in which the communication device is the remote terminal, and the notification unit notifies the relay terminal of the acquired information regarding the communication quality directly or indirectly via the base station.

(22)

A communication device including.

a communication unit configured to perform wireless communication; and a control unit configured to allocate a resource for communication between a first relay terminal and a second relay terminal in a case in which, on the basis of information regarding a communication quality of one or more radio links including at least one of a direct first radio link or a second radio link via a relay terminal, which is configured to be movable, between a remote terminal and a base station, it is decided that the radio link to be used in communication between the remote terminal and the base station is to be switched from the second radio link via the first relay terminal to the second radio link via the second relay terminal.

(23)

A communication method including:

performing wireless communication; and acquiring, by a computer, information regarding a communication quality of one or more radio links including at least one of a direct first radio link or a second radio link via a relay terminal, which is configured to be movable, between a remote terminal and a base station via wireless communication, and switching the radio link to be used in communication between the remote terminal and the base station on the basis of the acquired information regarding the communication quality.

(24)

A communication method including:

performing wireless communication; and acquiring, by a computer, information regarding a communication quality of at least one of a direct first radio link or a second radio link via a relay terminal, which is configured to be movable, between a remote terminal and a base station via wireless communication, and directly or indirectly notifying an external device that switches the radio link to be used in communication between the remote terminal and the base station of the acquired information regarding the communication quality.

(25)

A communication method including:

performing wireless communication; and allocating, by a computer, a resource for communication between a first relay terminal and a second relay terminal in a case in which, on the basis of information regarding a communication quality of one or more radio links including at least one of a direct first radio link or a second radio link via a relay terminal, which is configured to be movable, between a remote terminal and a base station, it is decided that the radio link to be used in communication between the remote terminal and the base station is to be switched from the second radio link via the first relay terminal to the second radio link via the second relay terminal.

REFERENCE SIGNS LIST

1 system
100 base station
100C relay terminal
110 antenna unit
120 wireless communication unit
130 network communication unit
140 storage unit
150 processing unit
151 communication processing unit
153 information acquisition unit
155 determination unit
157 notification unit
200 terminal device
200C remote terminal
210 antenna unit
220 wireless communication unit
230 storage unit
240 processing unit
241 communication processing unit
243 information acquisition unit
245 determination unit
247 notification unit

The invention claimed is:

1. A communication device comprising circuitry configured to:

perform wireless communication;

acquire information regarding a communication quality of one or more radio links including at least one of a direct first radio link, or a second radio link via a relay terminal, which is movable, between a remote terminal and a base station, information regarding the communication quality of the second radio link includes information regarding a communication quality of a third radio link between the remote terminal and the relay terminal;

acquire information regarding the communication quality of the third radio link in accordance with an estimation result of the communication quality based on a first threshold value for evaluating whether or not the communication quality reaches a predetermined level, a second threshold value for evaluating whether or not the communication quality no longer reaches a predetermined level, and a measurement result regarding the communication quality of the third radio link; and switch the radio link to be used in communication between the remote terminal and the base station on a basis of the acquired information regarding the communication quality.

2. The communication device according to claim 1, in which at least one of the first threshold value or the second threshold value is set by the base station or the relay terminal.

3. The communication device according to claim 1, wherein a resource for measurement of the communication quality is set by the base station or the relay terminal.

4. The communication device according to claim 1, wherein the communication device is one communication terminal of the remote terminal and the relay terminal, and the circuitry is configured to measure the information regarding the communication quality of the third radio link from the other communication terminal different from the one communication terminal.

5. The communication device according to claim 1, wherein the communication device is one communication terminal of the remote terminal and the relay terminal, and the circuitry is configured to acquire the communication quality of the third radio link and the information regarding the communication quality of the third radio link in accordance with the estimation result based on the measurement result, the first threshold value, and the second threshold value.

6. The communication device according to claim 5, wherein the circuitry is configured to intermittently measure a communication quality of a resource pool associated with the third radio link in time series and acquire the information regarding the communication quality of the third radio link on a basis of the measurement result.

7. The communication device according to claim 6, wherein the circuitry is configured to measure a communication quality of each of a plurality of the resource pools associated with the third radio link in time series.

8. The communication device according to claim 1, wherein the communication device is the base station, and the circuitry is configured to acquire the information regarding the communication quality of the third radio link from the remote terminal or the relay terminal.

9. The communication device according to claim 1, wherein, of the information regarding the communication quality of the second radio link, the circuitry is configured to acquire information regarding the communication quality of a fourth radio link between the relay terminal and the base station on a basis of a measurement result regarding the communication quality of the fourth radio link.

10. The communication device according to claim 9, wherein the communication device is the remote terminal, and the circuitry is configured to acquire the information regarding the communication quality of the fourth radio link by determining the communication quality of the fourth radio link on a basis of a second criterion that is different from a first criterion for the communication quality of the direct first radio link.

11. The communication device according to claim 10, wherein the second criterion is set such that degradation or improvement of the communication quality of the fourth radio link is determined on a basis of a smaller change in the communication quality than in a case in which the communication quality of the direct first radio link is determined.

12. The communication device according to claim 10, wherein the second criterion is set by the base station.

13. The communication device according to claim 10, wherein the circuitry is configured to calculate the second criterion on a basis of the first criterion.

14. The communication device according to claim 9, wherein the communication device is the relay terminal or the base station, and the circuitry is configured to acquire the information regarding the communication quality of the fourth radio link by measuring the communication quality of the fourth radio link.

15. The communication device according to claim 9, wherein the communication device is one communication terminal of the remote terminal and the relay terminal, and the circuitry is configured to acquire the information regarding the communication quality of the fourth radio link from the other communication terminal that is different from the one communication terminal.

16. The communication device according to claim 1, wherein the communication device is the relay terminal, and the circuitry is configured to perform control such that, in a case in which the radio link to be used in communication between the remote terminal and the base station is switched from the second radio link via a first relay terminal to the second radio link via a second relay terminal that is different from the first relay terminal, the second relay terminal is notified of a request for the switch directly or indirectly via the base station.

17. The communication device according to claim 16, wherein the circuitry is configured to perform control such that the second relay terminal is directly notified of the request for the switch in a case in which the second relay terminal is discovered on a basis of a search result for another relay terminal located in a vicinity, and perform control such that the second relay terminal is indirectly notified of the request for the switch via the base station in a case in which the second relay terminal is not discovered.

18. A communication device comprising circuitry configured to:

perform wireless communication;

acquire information regarding a communication quality of at least one of a direct first radio link or a second radio link via a relay terminal, which is movable, between a remote terminal and a base station, information regarding the communication quality of the second radio link includes information regarding a communication quality of a third radio link between the remote terminal and the relay terminal;

acquire information regarding the communication quality of the third radio link in accordance with an estimation result of the communication quality based on a first threshold value for evaluating whether or not the communication quality reaches a predetermined level, a second threshold value for evaluating whether or not the communication quality no longer reaches a predetermined level, and a measurement result regarding the communication quality of the third radio link; and directly or indirectly notify an external device that switches the radio link to be used in communication between the remote terminal and the base station of the acquired information regarding the communication quality.

19. The communication device according to claim 18, wherein the communication device is the relay terminal, and the circuitry is configured to notify the remote terminal of the acquired information regarding the communication quality directly or indirectly via the base station.

20. The communication device according to claim 18, wherein the communication device is the remote terminal, and the circuitry is configured to notify the relay terminal of the acquired information regarding the communication quality directly or indirectly via the base station.

21. A communication device comprising circuitry configured to:

perform wireless communication;

allocate a resource for communication between a first relay terminal and a second relay terminal in a case in which, on a basis of information regarding a communication quality of one or more radio links including at least one of a direct first radio link or a second radio link via a relay terminal, which is movable, between a remote terminal and a base station, information regarding the communication quality of the second radio link includes information regarding a communication quality of a third radio link between the remote terminal and the relay terminal;

acquire information regarding the communication quality of the third radio link in accordance with an estimation result of the communication quality based on a first threshold value for evaluating whether or not the communication quality reaches a predetermined level, a second threshold value for evaluating whether or not the communication quality no longer reaches a predetermined level, and a measurement result regarding the communication quality of the third radio link; and decide that the radio link to be used in communication between the remote terminal and the base station is to be switched from the second radio link via the first relay terminal to the second radio link via the second relay terminal.

22. A communication method comprising:

performing wireless communication;

acquiring, by a computer, information regarding a communication quality of one or more radio links including at least one of a direct first radio link or a second radio link via a relay terminal, which is movable, between a remote terminal and a base station via wireless communication, information regarding the communication quality of the second radio link includes information regarding a communication quality of a third radio link between the remote terminal and the relay terminal;

acquiring, by a computer, information regarding the communication quality of the third radio link in accordance with an estimation result of the communication quality based on a first threshold value for evaluating whether or not the communication quality reaches a predetermined level, a second threshold value for evaluating whether or not the communication quality no longer reaches a predetermined level, and a measurement result regarding the communication quality of the third radio link; and switching the radio link to be used in communication between the remote terminal and the base station on a basis of the acquired information regarding the communication quality.

23. A communication method comprising:

performing wireless communication;

acquiring, by a computer, information regarding a communication quality of at least one of a direct first radio link or a second radio link via a relay terminal, which is movable, between a remote terminal and a base station via wireless communication, information regarding the communication quality of the second radio link includes information regarding a communication quality of a third radio link between the remote terminal and the relay terminal;

acquiring, by a computer, information regarding the communication quality of the third radio link in accordance with an estimation result of the communication quality based on a first threshold value for evaluating whether or not the communication quality reaches a predetermined level, a second threshold value for evaluating whether or not the communication quality no longer reaches a predetermined level, and a measurement result regarding the communication quality of the third radio link; and directly or indirectly notifying an external device that switches the radio link to be used in communication between the remote terminal and the base station of the acquired information regarding the communication quality.

24. A communication method comprising:

performing wireless communication;

allocating, by a computer, a resource for communication between a first relay terminal and a second relay terminal in a case in which, on a basis of information regarding a communication quality of one or more radio links including at least one of a direct first radio link or a second radio link via a relay terminal, which is movable, between a remote terminal and a base station, information regarding the communication quality of the second radio link includes information regarding a communication quality of a third radio link between the remote terminal and the relay terminal, information regarding the communication quality of the third radio link in accordance with an estimation result of the communication quality based on a first threshold value for evaluating whether or not the communication quality reaches a predetermined level, a second threshold value for evaluating whether or not the communication quality no longer reaches a predetermined level, and a measurement result regarding the communication quality of the third radio link; and deciding that the radio link to be used in communication between the remote terminal and the base station is to be switched from the second radio link via the first relay terminal to the second radio link via the second relay terminal.

* * * * *